US010593074B1

(12) United States Patent
Friedman et al.

(10) Patent No.: US 10,593,074 B1
(45) Date of Patent: Mar. 17, 2020

(54) INTERACTIVE USER INTERFACE FOR DISPLAYING GEOGRAPHIC BOUNDARIES

(71) Applicant: Liberty Mutual Insurance Company, Boston, MA (US)

(72) Inventors: Benjamin Friedman, Boston, MA (US); Sandeep Kumar Gupta, North Easton, MA (US); Vishrut Prakash Srivastava, Hermosa Beach, CA (US); Jason Lee Kelly, Bellvue, WA (US); Brenton John Sellati, Framingham, MA (US); Christian Alexander Maas, Redondo Beach, CA (US); Erin Breslin, Boston, MA (US); Jon Ringer, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 0 days.

(21) Appl. No.: 15/459,423

(22) Filed: Mar. 15, 2017

Related U.S. Application Data

(60) Provisional application No. 62/309,150, filed on Mar. 16, 2016, provisional application No. 62/342,677,
(Continued)

(51) Int. Cl.
*G06T 11/20* (2006.01)
*G06Q 30/02* (2012.01)
(Continued)

(52) U.S. Cl.
CPC ........ *G06T 11/203* (2013.01); *G06F 3/04842* (2013.01); *G06F 16/29* (2019.01);
(Continued)

(58) Field of Classification Search
CPC ...... G06T 11/203; G06T 11/60; G06T 11/003; G06T 11/005; G06T 11/20;
(Continued)

(56) References Cited

U.S. PATENT DOCUMENTS

| 4,430,571 A | * | 2/1984 | Smith | ............... | B82Y 10/00 |
| | | | | | 250/396 R |
| 4,467,211 A | * | 8/1984 | Smith | ............... | B82Y 10/00 |
| | | | | | 250/491.1 |

(Continued)

FOREIGN PATENT DOCUMENTS

WO    WO 2001/001307 A2    1/2001

OTHER PUBLICATIONS

Cary, Joshua, "Pet Sitters: Create a Service Area map for Your Website", YouTube, <https://www.youtube.com/watch?v=ndzw1j483oQ>, Jul. 29, 2013, 2 pages.
(Continued)

*Primary Examiner* — Devona E Faulk
*Assistant Examiner* — Charles L Beard
(74) *Attorney, Agent, or Firm* — Alston & Bird LLP

(57) ABSTRACT

Responsive to receiving an indication of a geographical area, one or more constituent areas associated with the geographical area are identified. Boundary data corresponding to the constituent areas is accessed. The boundary data for each constituent area comprises a plurality of geographical location points defining line segments that define the boundary of the corresponding constituent area. Unique portions of line segments are identified. A unique portion of a line segment is a portion of a line segment defined in the boundary data of one and only one of the constituent areas. The geographical area boundary layer is defined. The geographical boundary layer comprises a set of line segments consisting of the unique portions of line segments. A geo-
(Continued)

graphical map is provided for display via a user interface. The geographical map comprises a plurality of layers. The plurality of layers comprise one or more map layer sand the geographical area boundary layer.

20 Claims, 16 Drawing Sheets

Related U.S. Application Data filed on May 27, 2016, provisional application No. 62/376,000, filed on Aug. 17, 2016.

(51) Int. Cl.
*G06F 3/0484* (2013.01)
*G06T 11/60* (2006.01)
*G06F 16/29* (2019.01)

(52) U.S. Cl.
CPC .......... *G06Q 30/0261* (2013.01); *G06T 11/60* (2013.01); *G06T 2200/24* (2013.01)

(58) Field of Classification Search
CPC ............. G06T 2200/24; G06T 2200/32; G06T 3/0031; G06T 17/05; G06F 3/04842; G06F 17/30241; G06F 17/30256; G06F 16/29; G06F 16/387; G06F 16/487; G06F 16/587; G06F 16/687; G06F 16/787; G06F 16/909; G06F 2221/2111; G06F 16/444; G06Q 30/0261; G06Q 30/0205; G06Q 30/0259

See application file for complete search history.

(56) References Cited

U.S. PATENT DOCUMENTS

| | | | | |
|---|---|---|---|---|
| 4,847,788 A * | 7/1989 | Shimada | .................. | G06T 17/05 345/634 |
| 5,748,174 A * | 5/1998 | Wong | .................. | G09G 5/14 345/683 |
| 5,771,169 A * | 6/1998 | Wendte | .................. | A01B 79/005 702/5 |
| 5,774,362 A * | 6/1998 | Suzuki | .................. | G01C 21/3614 701/532 |
| 5,796,634 A * | 8/1998 | Craport | .................. | G01C 21/00 340/988 |
| 5,961,569 A * | 10/1999 | Craport | .................. | G09B 29/106 345/642 |
| 5,961,572 A * | 10/1999 | Craport | .................. | G01S 5/00 340/990 |
| 5,968,109 A * | 10/1999 | Israni | .................. | G01C 21/32 701/532 |
| 5,978,747 A * | 11/1999 | Craport | .................. | G01C 21/00 340/988 |
| 6,029,141 A | 2/2000 | Bezos et al. | | |
| 6,075,467 A * | 6/2000 | Ninagawa | .................. | G01C 21/32 340/990 |
| 6,240,360 B1 * | 5/2001 | Phelan | .................. | G01C 21/26 701/438 |
| 6,247,019 B1 * | 6/2001 | Davies | .................. | G01C 21/32 701/448 |
| 6,262,741 B1 * | 7/2001 | Davies | .................. | G06T 17/05 345/423 |
| 6,334,111 B1 | 12/2001 | Carrott | | |
| 6,339,744 B1 * | 1/2002 | Hancock | .................. | G01C 21/20 701/468 |
| 6,565,610 B1 * | 5/2003 | Wang | .................. | G01C 21/3673 345/619 |
| 6,574,554 B1 * | 6/2003 | Beesley | .................. | G01C 21/30 340/990 |
| 6,615,184 B1 | 9/2003 | Hicks | | |
| 6,618,497 B1 * | 9/2003 | Nakayama | .................. | G01C 11/06 382/154 |
| 6,956,590 B1 * | 10/2005 | Barton | .................. | G01C 21/367 345/671 |
| 7,197,500 B1 * | 3/2007 | Israni | .................. | G01C 21/32 340/995.14 |
| 7,317,927 B2 * | 1/2008 | Staton | .................. | G08B 21/0211 455/456.4 |
| 7,489,939 B2 * | 2/2009 | Ashley, Jr. | .................. | G01S 5/0027 455/456.6 |
| 7,616,964 B2 | 11/2009 | Riise et al. | | |
| 7,672,778 B1 * | 3/2010 | Elliott | .................. | G01C 21/32 701/102 |
| 7,676,376 B2 | 3/2010 | Colman | | |
| 7,774,229 B1 | 8/2010 | Dernehl et al. | | |
| 7,805,003 B1 * | 9/2010 | Cohen | .................. | G06K 9/00463 382/103 |
| 7,890,509 B1 * | 2/2011 | Pearcy | .................. | G06Q 10/06 707/736 |
| 7,916,142 B2 * | 3/2011 | Carroll | .................. | G06F 17/30241 340/995.14 |
| 8,136,044 B2 * | 3/2012 | Muhonen | .................. | G06F 17/3087 715/764 |
| 8,200,186 B2 * | 6/2012 | Ashley, Jr. | .................. | G01S 5/0018 455/404.2 |
| 8,285,245 B2 * | 10/2012 | Ashley, Jr. | .................. | G01S 5/0289 455/404.1 |
| 8,315,203 B2 * | 11/2012 | Ashley, Jr. | .................. | G01S 5/0289 370/312 |
| 8,355,600 B1 * | 1/2013 | Haught | .................. | G06T 17/05 382/162 |
| 8,428,867 B2 * | 4/2013 | Ashley, Jr. | .................. | G01S 5/0045 342/357.25 |
| 8,504,393 B2 * | 8/2013 | Stewart | .................. | G06Q 40/08 705/35 |
| 8,612,278 B1 * | 12/2013 | Ashley, Jr. | .................. | G06Q 30/02 705/7.25 |
| 8,612,484 B1 | 12/2013 | Woll | | |
| 8,649,567 B1 * | 2/2014 | Maltby, II | .................. | G06T 17/05 382/106 |
| 8,650,072 B2 | 2/2014 | Mason et al. | | |
| 8,660,793 B2 * | 2/2014 | Ngo | .................. | G01C 21/20 701/520 |
| 8,732,219 B1 * | 5/2014 | Ferries | .................. | G06F 17/30241 707/723 |
| 8,890,898 B2 * | 11/2014 | Tsai | .................. | G06F 3/017 345/684 |
| 8,965,406 B2 * | 2/2015 | Henderson | .................. | H04W 4/021 455/414.2 |
| 9,043,223 B1 * | 5/2015 | Niu | .................. | G06Q 30/0242 705/14.41 |
| 9,053,495 B1 * | 6/2015 | Niu | .................. | G06Q 30/0261 |
| 9,063,951 B1 * | 6/2015 | Zhu | .................. | G06F 17/30241 |
| 9,069,793 B2 * | 6/2015 | Kadowaki | .................. | G06F 17/30241 |
| 9,082,189 B2 * | 7/2015 | Look | .................. | G06K 9/3216 |
| 9,122,943 B1 * | 9/2015 | Muszynski | .................. | G06K 9/033 |
| 9,146,939 B1 * | 9/2015 | Zhdanovich | .................. | G06F 17/30241 |
| 9,198,109 B2 * | 11/2015 | Schmidt | .................. | H04W 36/32 |
| 9,245,366 B1 * | 1/2016 | Magouyrk | .................. | G06T 11/60 |
| 9,286,705 B1 * | 3/2016 | Haught | .................. | G06T 17/05 |
| 9,288,620 B2 * | 3/2016 | Menendez | .................. | H04W 4/021 |
| 9,291,700 B1 * | 3/2016 | Rose | .................. | G06F 16/29 |
| 9,311,718 B2 * | 4/2016 | Scavezze | .................. | G06T 7/20 |
| 9,319,837 B2 * | 4/2016 | Josefiak | .................. | G01C 21/32 |
| 9,351,114 B2 * | 5/2016 | Chatterjee | .................. | H04W 4/021 |
| 9,436,313 B1 * | 9/2016 | Kalyanaraman | .................. | G06F 3/0416 |
| 9,467,839 B1 * | 10/2016 | Nishimura | .................. | H04W 4/02 |
| 9,535,586 B2 * | 1/2017 | Johnson | .................. | G01C 21/00 |
| 9,563,576 B1 * | 2/2017 | Horon | .................. | G06F 13/00 |
| 9,638,539 B2 * | 5/2017 | Tertoolen | .................. | G01C 21/367 |
| 9,706,355 B1 * | 7/2017 | Cali | .................. | H04W 4/022 |
| 9,712,962 B2 * | 7/2017 | Birch | .................. | H04W 4/021 |
| 9,743,235 B1 * | 8/2017 | Reyes | .................. | H04W 4/021 |
| 9,769,610 B1 * | 9/2017 | Gordon | .................. | H04W 4/023 |
| 9,798,926 B2 * | 10/2017 | Pahwa | .................. | G06K 9/00476 |
| 9,824,463 B2 * | 11/2017 | Ingrassia | .................. | G06T 11/001 |
| 9,838,843 B1 * | 12/2017 | Bajaj | .................. | H04W 4/022 |

(56) References Cited

U.S. PATENT DOCUMENTS

| | | | | |
|---|---|---|---|---|
| 9,874,450 B2* | 1/2018 | Vakharia | | G01C 21/32 |
| 9,934,757 B2* | 4/2018 | Korzunov | | G09G 5/006 |
| 9,974,008 B2* | 5/2018 | May | | H04W 48/16 |
| 10,002,156 B2* | 6/2018 | Lublinsky | | G06F 17/30241 |
| 10,013,474 B2* | 7/2018 | Sample | | G06F 17/30581 |
| 10,051,417 B2* | 8/2018 | Borghei | | H04W 4/021 |
| 10,064,037 B2* | 8/2018 | Lee | | H04W 76/14 |
| 10,274,326 B1* | 4/2019 | Stewart | | G01C 21/32 |
| 10,445,927 B2* | 10/2019 | Kwant | | G06T 17/05 |
| 2001/0016796 A1* | 8/2001 | Ata | | G01C 21/3682 |
| | | | | 701/438 |
| 2001/0019309 A1* | 9/2001 | Saeki | | G01C 21/32 |
| | | | | 340/995.1 |
| 2002/0069116 A1 | 6/2002 | Ohashi et al. | | |
| 2002/0122564 A1* | 9/2002 | Rhoads | | G01C 11/00 |
| | | | | 382/100 |
| 2002/0147625 A1 | 10/2002 | Kolke | | |
| 2002/0188581 A1* | 12/2002 | Fortin | | H04L 67/16 |
| | | | | 706/20 |
| 2003/0014224 A1* | 1/2003 | Guo | | G06F 17/5004 |
| | | | | 703/1 |
| 2003/0032404 A1 | 2/2003 | Wager et al. | | |
| 2003/0037059 A1* | 2/2003 | Yang | | G06T 17/05 |
| 2003/0083073 A1* | 5/2003 | Cossins | | H04L 41/0253 |
| | | | | 455/446 |
| 2003/0132932 A1* | 7/2003 | Yang | | G06T 11/203 |
| | | | | 345/418 |
| 2003/0158667 A1* | 8/2003 | Chen | | G06F 16/29 |
| | | | | 702/5 |
| 2003/0215110 A1* | 11/2003 | Rhoads | | G01C 11/00 |
| | | | | 382/100 |
| 2003/0220735 A1* | 11/2003 | Nimura | | G01C 21/32 |
| | | | | 701/421 |
| 2003/0231190 A1* | 12/2003 | Jawerth | | G06T 9/00 |
| | | | | 345/660 |
| 2004/0218894 A1* | 11/2004 | Harville | | G06F 17/30241 |
| | | | | 386/241 |
| 2004/0227766 A1* | 11/2004 | Chou | | G06T 15/04 |
| | | | | 345/582 |
| 2005/0140524 A1* | 6/2005 | Kato | | G08G 1/096811 |
| | | | | 340/995.13 |
| 2005/0270311 A1* | 12/2005 | Rasmussen | | G01C 21/32 |
| | | | | 345/677 |
| 2005/0272443 A1* | 12/2005 | Hose | | G08G 1/207 |
| | | | | 455/456.1 |
| 2006/0002590 A1* | 1/2006 | Borak | | G01C 21/32 |
| | | | | 382/104 |
| 2006/0074547 A1* | 4/2006 | Kaufman | | G01C 21/32 |
| | | | | 701/451 |
| 2006/0200305 A1* | 9/2006 | Sheha | | G01C 21/20 |
| | | | | 701/420 |
| 2006/0238379 A1* | 10/2006 | Kimchi | | G01C 21/26 |
| | | | | 340/995.1 |
| 2007/0213929 A1* | 9/2007 | Tanizaki | | G06F 16/29 |
| | | | | 701/451 |
| 2007/0229524 A1* | 10/2007 | Hendrey | | G06F 3/0481 |
| | | | | 345/552 |
| 2008/0036787 A1* | 2/2008 | Gelber | | G09B 29/10 |
| | | | | 345/619 |
| 2008/0089405 A1* | 4/2008 | Cho | | H04N 19/597 |
| | | | | 375/240.01 |
| 2008/0104531 A1* | 5/2008 | Stambaugh | | G01C 21/30 |
| | | | | 715/771 |
| 2008/0109756 A1* | 5/2008 | Stambaugh | | G06F 3/0481 |
| | | | | 715/835 |
| 2008/0109757 A1* | 5/2008 | Stambaugh | | G06F 3/0481 |
| | | | | 715/835 |
| 2008/0109758 A1* | 5/2008 | Stambaugh | | G06F 3/0481 |
| | | | | 715/835 |
| 2008/0109759 A1* | 5/2008 | Stambaugh | | G06F 3/0481 |
| | | | | 715/835 |
| 2008/0109761 A1* | 5/2008 | Stambaugh | | G06F 3/0482 |
| | | | | 715/853 |
| 2008/0172632 A1* | 7/2008 | Stambaugh | | G06F 3/04817 |
| | | | | 715/781 |
| 2008/0238941 A1* | 10/2008 | Kinnan | | G09B 29/007 |
| | | | | 345/630 |
| 2008/0273791 A1* | 11/2008 | Lee | | G06K 9/00771 |
| | | | | 382/153 |
| 2009/0012955 A1* | 1/2009 | Chu | | G01C 21/3679 |
| 2009/0021522 A1* | 1/2009 | Burley | | G06T 15/04 |
| | | | | 345/582 |
| 2009/0063234 A1* | 3/2009 | Refsland | | G06Q 10/06 |
| | | | | 705/7.15 |
| 2009/0132469 A1* | 5/2009 | White | | G06Q 10/00 |
| 2009/0132929 A1* | 5/2009 | Reed, Jr. | | G06F 17/3087 |
| | | | | 715/739 |
| 2009/0295828 A1* | 12/2009 | Koziarz | | G06T 11/203 |
| | | | | 345/619 |
| 2009/0299619 A1* | 12/2009 | Dean | | G01C 21/00 |
| | | | | 701/532 |
| 2009/0300528 A1* | 12/2009 | Stambaugh | | G06F 3/04817 |
| | | | | 715/764 |
| 2010/0017261 A1* | 1/2010 | Evans | | G06Q 30/02 |
| | | | | 705/7.34 |
| 2010/0034483 A1* | 2/2010 | Giuffrida | | G06T 3/4038 |
| | | | | 382/284 |
| 2010/0090852 A1* | 4/2010 | Eitan | | G08G 1/207 |
| | | | | 340/686.1 |
| 2010/0094548 A1* | 4/2010 | Tadman | | G01C 21/36 |
| | | | | 701/533 |
| 2010/0106420 A1* | 4/2010 | Mattikalli | | G06T 17/05 |
| | | | | 702/2 |
| 2010/0118025 A1* | 5/2010 | Smith | | G06Q 30/02 |
| | | | | 345/418 |
| 2010/0191797 A1* | 7/2010 | Seefeld | | G06F 17/30241 |
| | | | | 709/203 |
| 2010/0191798 A1* | 7/2010 | Seefeld | | G06F 17/30241 |
| | | | | 709/203 |
| 2010/0249771 A1* | 9/2010 | Pearson | | A61B 18/1206 |
| | | | | 606/34 |
| 2010/0259557 A1* | 10/2010 | McMullen | | G06T 11/60 |
| | | | | 345/619 |
| 2010/0295857 A1* | 11/2010 | Onizawa | | G01C 21/32 |
| | | | | 345/441 |
| 2011/0054978 A1 | 3/2011 | Mohil | | |
| 2011/0055290 A1* | 3/2011 | Li | | G06F 17/30241 |
| | | | | 707/807 |
| 2011/0173066 A1* | 7/2011 | Simmons | | G06Q 30/00 |
| | | | | 705/14.49 |
| 2011/0214050 A1* | 9/2011 | Stambaugh | | G06F 3/04817 |
| | | | | 715/234 |
| 2011/0267350 A1* | 11/2011 | Curbera | | G06T 11/206 |
| | | | | 345/440 |
| 2012/0008526 A1* | 1/2012 | Borghei | | H04W 4/021 |
| | | | | 370/254 |
| 2012/0034349 A1* | 2/2012 | Jing | | G06K 9/342 |
| | | | | 426/231 |
| 2012/0109577 A1* | 5/2012 | Nyhart | | G01C 3/08 |
| | | | | 702/159 |
| 2012/0127297 A1* | 5/2012 | Baxi | | G06T 7/0002 |
| | | | | 348/79 |
| 2012/0144349 A1* | 6/2012 | Dai | | G06F 17/5081 |
| | | | | 716/52 |
| 2012/0144355 A1* | 6/2012 | Dai | | G06F 17/5081 |
| | | | | 716/112 |
| 2012/0207360 A1* | 8/2012 | Mehanian | | G06K 9/0014 |
| | | | | 382/128 |
| 2012/0225672 A1* | 9/2012 | Tholkes | | H04W 4/021 |
| | | | | 455/456.3 |
| 2012/0246336 A1* | 9/2012 | Sathish | | G06F 9/5055 |
| | | | | 709/238 |
| 2012/0271848 A1* | 10/2012 | Kadowaki | | G06F 17/30241 |
| | | | | 707/769 |
| 2012/0284100 A1* | 11/2012 | Goldberg | | G06Q 30/02 |
| | | | | 705/14.19 |

(56) References Cited

U.S. PATENT DOCUMENTS

| | | | |
|---|---|---|---|
| 2012/0316935 A1* | 12/2012 | Feuerstin | G06Q 30/02 705/14.13 |
| 2012/0327837 A1* | 12/2012 | Harrington | H04W 4/90 370/312 |
| 2013/0016112 A1* | 1/2013 | Burley | G06T 15/04 345/582 |
| 2013/0066881 A1* | 3/2013 | Park | G06F 17/30241 707/743 |
| 2013/0072223 A1* | 3/2013 | Berenberg | H04W 4/02 455/456.1 |
| 2013/0083967 A1* | 4/2013 | Vorobiov | G06T 7/593 382/103 |
| 2013/0091452 A1* | 4/2013 | Sorden | G06F 3/048 715/771 |
| 2013/0103697 A1* | 4/2013 | Hill | G01C 21/20 707/748 |
| 2013/0106990 A1* | 5/2013 | Williams | G06T 3/4038 348/36 |
| 2013/0124563 A1* | 5/2013 | CaveLie | G06F 17/30241 707/770 |
| 2013/0147820 A1* | 6/2013 | Kalai | G01C 21/32 345/522 |
| 2013/0147846 A1* | 6/2013 | Kalai | G06T 1/60 345/660 |
| 2013/0176232 A1* | 7/2013 | Waeller | B60K 35/00 345/173 |
| 2013/0243352 A1* | 9/2013 | Khurd | G06T 3/0068 382/284 |
| 2013/0321458 A1* | 12/2013 | Miserendino | H04L 41/0883 345/629 |
| 2013/0332476 A1* | 12/2013 | Sinha | G06F 17/30241 707/756 |
| 2014/0019302 A1* | 1/2014 | Meadow | G06K 9/32 705/26.61 |
| 2014/0067937 A1* | 3/2014 | Bosworth | H04L 65/403 709/204 |
| 2014/0078150 A1* | 3/2014 | Li | G06T 11/60 345/440 |
| 2014/0089243 A1* | 3/2014 | Oppenheimer | G06F 21/50 706/46 |
| 2014/0095497 A1* | 4/2014 | Howe | G06F 17/30241 707/736 |
| 2014/0129293 A1* | 5/2014 | Chang | G06Q 30/0205 705/7.34 |
| 2014/0218642 A1* | 8/2014 | Iwami | G06F 3/044 349/12 |
| 2014/0270537 A1* | 9/2014 | Lo | G06T 11/60 382/195 |
| 2014/0279573 A1* | 9/2014 | Coats | G06Q 30/0278 705/306 |
| 2014/0280064 A1* | 9/2014 | McDougall | G06N 5/04 707/722 |
| 2014/0340426 A1* | 11/2014 | Furuhata | G06T 11/60 345/635 |
| 2014/0344296 A1* | 11/2014 | Chawathe | G06F 17/30241 707/755 |
| 2014/0365935 A1* | 12/2014 | Moha | G06F 3/04815 715/769 |
| 2015/0035857 A1* | 2/2015 | Lowe | G09G 5/377 345/629 |
| 2015/0046151 A1* | 2/2015 | Lane | G06F 17/2785 704/9 |
| 2015/0070523 A1* | 3/2015 | Chao | H04N 5/23216 348/218.1 |
| 2015/0077276 A1* | 3/2015 | Mitchell | H04W 4/021 340/995.1 |
| 2015/0081212 A1* | 3/2015 | Mitchell | G01C 21/367 701/454 |
| 2015/0095355 A1* | 4/2015 | Patton | G06F 17/30241 707/754 |
| 2015/0130817 A1* | 5/2015 | Appleton | G09B 29/106 345/501 |
| 2015/0154797 A1* | 6/2015 | Soulard | G06T 17/205 345/423 |
| 2015/0161890 A1* | 6/2015 | Huntzicker | G08G 1/144 340/932.2 |
| 2015/0169190 A1* | 6/2015 | Girardeau | G06F 3/04842 715/771 |
| 2015/0186443 A1* | 7/2015 | Ito | G06F 17/30241 707/618 |
| 2015/0235390 A1* | 8/2015 | Jones | G06T 11/20 345/440 |
| 2015/0245189 A1* | 8/2015 | Nalluri | G06Q 50/265 455/404.1 |
| 2015/0248192 A1* | 9/2015 | Katragadda | G06F 17/30241 715/771 |
| 2015/0278978 A1* | 10/2015 | Kalan | G01C 21/20 705/13 |
| 2015/0281889 A1* | 10/2015 | Menendez | H04W 4/021 455/456.1 |
| 2015/0332325 A1* | 11/2015 | Sharma | H04W 4/029 705/14.57 |
| 2015/0338224 A1* | 11/2015 | Geisberger | G01C 21/3446 701/527 |
| 2015/0347457 A1* | 12/2015 | Zhu | G06F 17/30241 707/743 |
| 2015/0371420 A1* | 12/2015 | Yerushalmy | G06T 3/4038 382/284 |
| 2016/0027055 A1* | 1/2016 | Dixon | G06Q 30/0261 705/14.58 |
| 2016/0034515 A1* | 2/2016 | Katragadda | G06F 17/30241 707/691 |
| 2016/0055668 A1* | 2/2016 | Singer | G06T 17/05 345/440 |
| 2016/0057575 A1* | 2/2016 | Chang | H04W 4/021 455/414.2 |
| 2016/0063705 A1* | 3/2016 | Xu | G06T 5/50 382/199 |
| 2016/0063722 A1* | 3/2016 | Allred | G06T 11/203 345/665 |
| 2016/0088546 A1* | 3/2016 | Birch | H04L 67/18 455/456.3 |
| 2016/0092077 A1* | 3/2016 | Buyrn | G06F 16/29 715/771 |
| 2016/0098598 A1* | 4/2016 | Pahwa | G01C 21/32 382/113 |
| 2016/0140510 A1* | 5/2016 | Schultz | G06Q 10/1095 705/7.19 |
| 2016/0179830 A1* | 6/2016 | Schmalstieg | G06F 17/30333 707/722 |
| 2016/0180561 A1* | 6/2016 | Dobrowolski | G06T 11/60 345/635 |
| 2016/0217597 A1* | 7/2016 | Hendrey | G06T 11/20 |
| 2016/0266579 A1* | 9/2016 | Chen | G05D 1/0038 |
| 2016/0275131 A1* | 9/2016 | Lublinsky | G06F 17/30241 |
| 2016/0292815 A1* | 10/2016 | Bell | G06T 1/20 |
| 2016/0321524 A1* | 11/2016 | Rubinton | G06K 15/1802 |
| 2016/0329031 A1* | 11/2016 | Yang | G06F 3/0485 |
| 2016/0345035 A1* | 11/2016 | Han | H04N 21/23424 |
| 2016/0370196 A1* | 12/2016 | Gotoh | G06F 16/29 |
| 2016/0371326 A1* | 12/2016 | Gotoh | G06F 16/2379 |
| 2016/0379388 A1* | 12/2016 | Rasco | G06F 17/3028 715/753 |
| 2017/0018184 A1* | 1/2017 | Northrup | G08G 1/144 |
| 2017/0024804 A1* | 1/2017 | Tepfenhart, Jr. | G06Q 30/0635 |
| 2017/0030719 A1* | 2/2017 | Ishida | G08G 5/0095 |
| 2017/0076328 A1* | 3/2017 | Suzuki | G06Q 10/10 |
| 2017/0078840 A1* | 3/2017 | Saurav | H04W 4/021 |
| 2017/0090461 A1* | 3/2017 | Chong | B33Y 40/00 |
| 2017/0108340 A1* | 4/2017 | Devi | G01C 21/30 |
| 2017/0142340 A1* | 5/2017 | Kishi | H04N 5/23293 |
| 2017/0146970 A1* | 5/2017 | Joo | G05B 19/042 |
| 2017/0163558 A1* | 6/2017 | Deshmukh | H04L 67/1002 |
| 2017/0164159 A1* | 6/2017 | Mycek | G06Q 30/0633 |
| 2017/0178034 A1* | 6/2017 | Skeen | G06F 17/30389 |
| 2017/0186202 A1* | 6/2017 | Kikuta | G06T 7/13 |
| 2017/0199046 A1* | 7/2017 | Lee | G01C 21/3415 |
| 2017/0205885 A1* | 7/2017 | Schpok | G01C 21/26 |
| 2017/0221102 A1* | 8/2017 | Carroll | G06Q 30/0261 |

(56) References Cited

U.S. PATENT DOCUMENTS

| | | | | |
|---|---|---|---|---|
| 2017/0249780 A1* | 8/2017 | Slack | | G06F 17/50 |
| 2017/0261328 A1* | 9/2017 | Tuukkanen | | G01C 21/32 |
| 2017/0272927 A1* | 9/2017 | Nishimura | | H04W 4/04 |
| 2017/0276490 A1* | 9/2017 | Rosenberg | | G01C 21/32 |
| 2017/0289074 A1* | 10/2017 | Joo | | H04L 51/04 |
| 2017/0295127 A1* | 10/2017 | He | | H04L 51/32 |
| 2017/0301117 A1* | 10/2017 | Lanza | | G09B 29/007 |
| 2017/0301118 A1* | 10/2017 | Lanza | | G06T 11/60 |
| 2017/0303106 A1* | 10/2017 | Kannan | | H04W 4/90 |
| 2017/0323457 A1* | 11/2017 | Korzunov | | G06T 7/73 |
| 2017/0330532 A1* | 11/2017 | Yang | | G06F 17/3028 |
| 2017/0357668 A1* | 12/2017 | Fortin | | G06Q 30/0201 |
| 2017/0358057 A1* | 12/2017 | Dexter | | G06T 3/4038 |
| 2017/0365093 A1* | 12/2017 | Stacey | | G06T 17/05 |
| 2017/0371883 A1* | 12/2017 | Bailiang | | G06F 3/017 |
| 2017/0372618 A1* | 12/2017 | Xu | | G05D 1/0214 |
| 2018/0033244 A1* | 2/2018 | Northrup | | H04W 4/21 |
| 2018/0052594 A1* | 2/2018 | Bemel-Benrud | ... | G06F 16/2379 |
| 2018/0074508 A1* | 3/2018 | Kleiner | | A47L 9/0488 |
| 2018/0084381 A1* | 3/2018 | Ohbitsu | | G06F 16/29 |
| 2018/0121958 A1* | 5/2018 | Aist | | G06Q 30/0261 |
| 2018/0137675 A1* | 5/2018 | Kwant | | G06T 17/05 |
| 2018/0144643 A1* | 5/2018 | Moravek | | G08G 5/0021 |
| 2018/0180688 A1* | 6/2018 | Koch | | G01R 33/243 |
| 2018/0205889 A1* | 7/2018 | Abbas | | H04N 5/265 |
| 2018/0225835 A1* | 8/2018 | Harada | | G05D 1/0274 |
| 2018/0232397 A1* | 8/2018 | Liu | | G06F 7/08 |
| 2018/0232840 A1* | 8/2018 | Liu | | G06F 7/08 |
| 2018/0252924 A1* | 9/2018 | Jepsen | | G02B 27/0101 |
| 2018/0255465 A1* | 9/2018 | Priest | | H04W 16/18 |
| 2018/0302835 A1* | 10/2018 | Yamasaki | | H04W 36/32 |
| 2018/0306132 A1* | 10/2018 | Hotta | | F02D 37/02 |
| 2018/0310274 A1* | 10/2018 | Fan | | G01S 5/0027 |
| 2018/0373394 A1* | 12/2018 | Wilson | | G06F 3/0481 |
| 2019/0007684 A1* | 1/2019 | Van Der Auwera | | H04N 19/119 |
| 2019/0045324 A1* | 2/2019 | Eldic | | H04W 4/029 |
| 2019/0050449 A1* | 2/2019 | Gokhale | | G06Q 10/067 |
| 2019/0080520 A1* | 3/2019 | Godzaridis | | G06T 19/20 |
| 2019/0087840 A1* | 3/2019 | Zachariah | | G06Q 30/0205 |
| 2019/0101402 A1* | 4/2019 | Chien | | G06F 16/9024 |
| 2019/0120633 A1* | 4/2019 | Afrouzi | | G01C 21/165 |
| 2019/0128679 A1* | 5/2019 | Thompson | | G01C 21/32 |
| 2019/0163174 A1* | 5/2019 | Ko | | G05D 1/0011 |
| 2019/0163175 A1* | 5/2019 | Ko | | G05D 1/0088 |
| 2019/0193682 A1* | 6/2019 | Santiano | | B60R 25/33 |

OTHER PUBLICATIONS

Facilitykart, "Home Services", May 28, 2015 to Jun. 5, 2017, Internet Archive <http://web.archive.org/web/20150528004829/http://www.facilitykart.com/>, 9 pages.

Greenpal, "How it Works", Nov. 7, 2013 to Nov. 13, 2016, Internet Archive <https://web.archive.org/web/20131107061046/http://yourgreenpal.com:80/how-it-works>, 1 page.

Housecall, "Book, schedule, pay . . . all from your phone", Dec. 4, 2014 to Feb. 14, 2017, Internet Archive <https://web.archive.org/web/20141204132930/http://tryhousecall.com/app>, 6 pages.

Taskbob, "Reliable Home Services", Dec. 27, 2014 to Jun. 7, 2017, Internet Archive <https://web.archive.org/web/20141227064446/https://www.taskbob.com/>, 4 pages.

Veerasamy, Visakan, "Dropbox's Referral Program—How They Got 4 Million Users in 15 Months", ReferralCandy Blog, Jan. 21, 2014, retrieved from <http://www.referralcandy.com/blog/referrals-built-dropbox-empire/>, 31 pages.

* cited by examiner

| GEOGRAPHICAL AREA NAME | GEOGRAPHICAL AREA IDENTIFIER | CONSTITUENT AREA NAME | CONSTITUENT AREA IDENTIFIER |
|---|---|---|---|
| Boston | 1 | North End | 5464 |
| Boston | 1 | Downtown Boston | 21525 |
| Boston | 1 | West End | 5473 |
| Boston | 1 | Chinatown - Leather District | 5452 |
| Boston | 1 | Bay Village | 59460 |
| Beacon Hill | 2 | Beacon Hill | 21524 |
| South Boston | 3 | D Street - West Broadway | 21528 |
| South Boston | 3 | Telegraph Hill | 21527 |
| South Boston | 3 | City Point | 21529 |
| South Boston | 3 | Columbus Park - Andrew Square | 21526 |
| South End | 4 | South End | 5472 |
| Back Bay | 5 | Back Bay | 5448 |
| Kenmore / Fenway | 6 | Fenway - Kenmore - Audubon Circle - Longwood | 5455 |
| Brookline | 7 | Coolidge Corner | 66088 |
| Brookline | 7 | Brookline Village | 66087 |
| Brookline | 7 | South Brookline | 66086 |
| Brookline | 7 | Washington Square | 66091 |
| Brookline | 7 | Mission Hill | 5460 |
| Brighton | 8 | Oak Square | 21514 |
| Brighton | 8 | St. Elizabeth's | 21515 |
| Brighton | 8 | Commonwealth | 21537 |
| Brighton | 8 | Cleveland Circle | 66089 |
| Brighton | 8 | Chestnut Hill | 59462 |
| Cambridge | 9 | North Cambridge | 5484 |
| Cambridge | 9 | Porter Square | 73229 |
| Cambridge | 9 | Cambridge Highlands | 5478 |
| Cambridge | 9 | Strawberry Hill | 5486 |
| Cambridge | 9 | Neighborhood Nine | 5483 |
| Cambridge | 9 | West Cambridge | 5488 |
| Cambridge | 9 | Aggasiz - Harvard University | 5476 |
| Cambridge | 9 | Ward Two | 21549 |
| Cambridge | 9 | Harvard Square | 73228 |
| Cambridge | 9 | Riverside | 5485 |
| Cambridge | 9 | Mid-Cambridge | 5481 |
| Cambridge | 9 | Inman Square | 73216 |
| Cambridge | 9 | Wellington - Harrington | 5487 |
| Cambridge | 9 | Area IV | 5477 |
| Cambridge | 9 | Cambridgeport | 5479 |
| Cambridge | 9 | MIT | 5482 |
| Cambridge | 9 | Kendall Square | 73213 |
| Cambridge | 9 | East Cambridge | 5480 |
| Allston | 10 | Allston | 21513 |
| Charlestown | 11 | Thompson Square - Bunker Hill | 21530 |
| Charlestown | 11 | Medford Street - The Neck | 21531 |
| Somerville | 12 | Industrial Park | 21550 |
| Somerville | 12 | Prospect Hill | 21548 |
| Somerville | 12 | East Somerville | 21547 |
| Somerville | 12 | Spring Hill | 21543 |
| Somerville | 12 | Winter Hill | 21544 |
| Somerville | 12 | Ten Hills | 21545 |
| Somerville | 12 | Mystic River | 21546 |
| Somerville | 12 | Powder House | 21541 |

FIG. 8

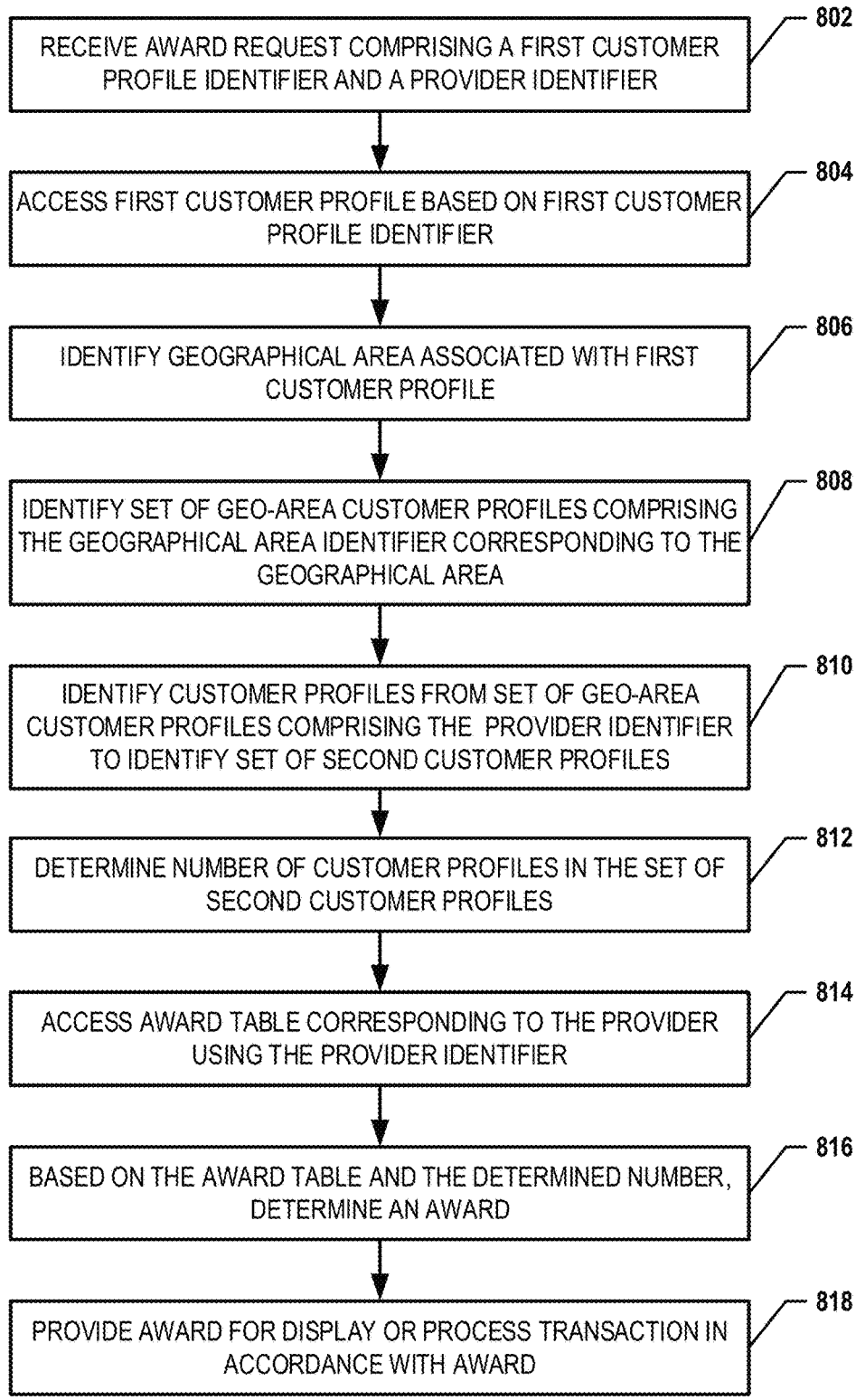

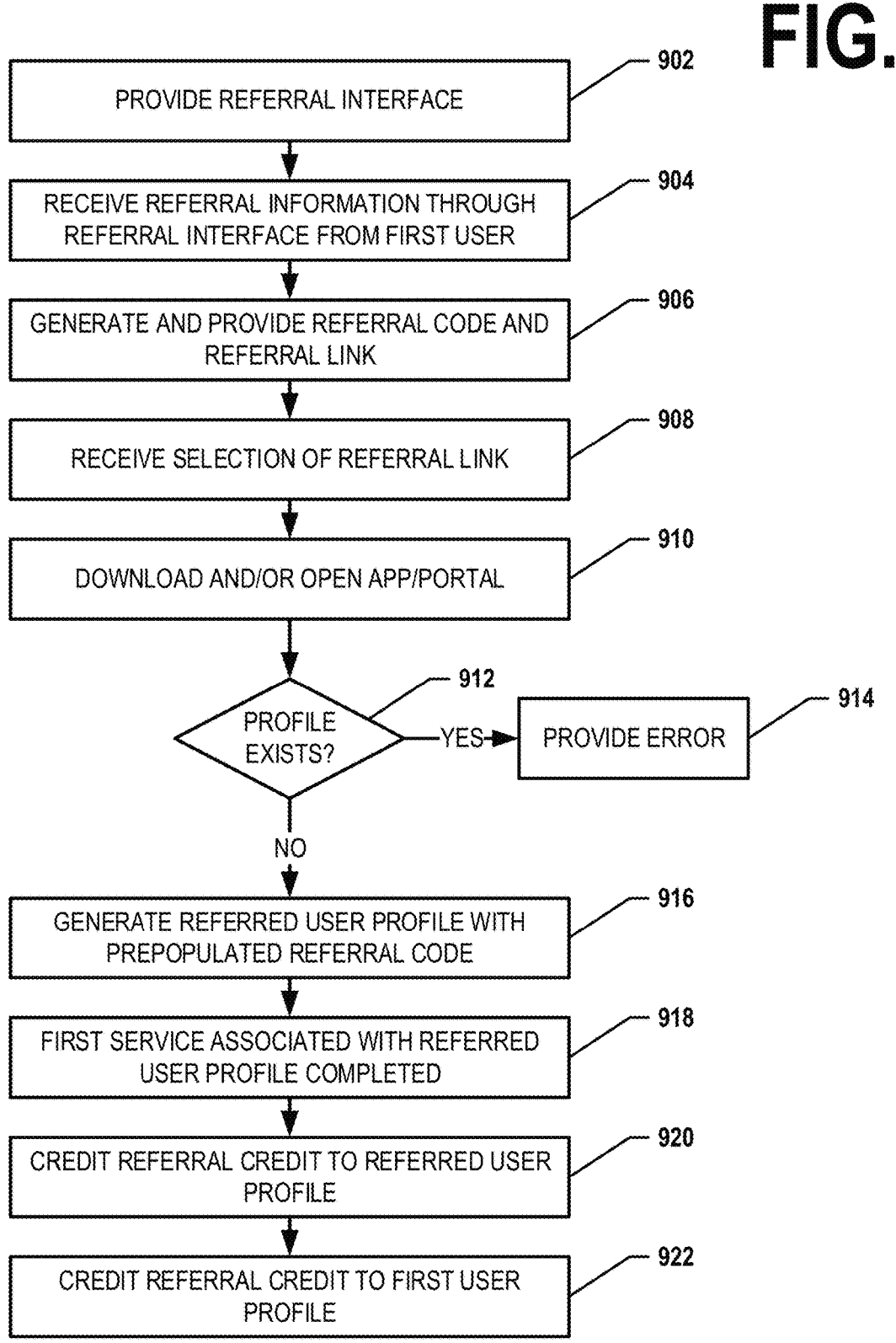

INTERACTIVE USER INTERFACE FOR DISPLAYING GEOGRAPHIC BOUNDARIES

CROSS-REFERENCE TO RELATED APPLICATIONS

This application claims priority to U.S. Application Ser. No. 62/309,150, filed Mar. 16, 2016; U.S. Application Ser. No. 62/342,677, filed May 27, 2016; and U.S. Application No. 62/376,000, filed Aug. 17, 2016, which are hereby incorporated herein in their entireties.

BACKGROUND

In various scenarios, a provider may offer services and/or the like within one or more geographic areas. The provider may wish to select one or more predefined geographical areas and/or define one or more geographical areas within which the provider offers services such that the geographic areas may be provided to potential customers. However, it may be difficult for a provider to easily and intuitively select and/or define such geographical areas using a user interface. Once the geographical areas have been selected and/or defined the geographical areas need to be efficiently and effectively communicated to potential customers in a user friendly manner.

Thus, there is a need in the art for methods, apparatuses, systems, computer program products, and/or the like that allows a user (e.g., a provider) to easily and intuitively define geographical areas and to efficiently and effectively present the geographical areas to users (e.g., customers and/or potential customers).

Additionally, platforms that allow providers to advertise their services to prospective customers may wish to find ways to increase the number of users (e.g., providers, customers, and/or potential customers) accessing the platform and/or harness user locations to provide incentives, awards, discounts, and/or the like. For example, providers may save on transportation costs and time if they can provide services to multiple customers in the same neighborhood and may wish to pass those savings on to customers to encourage existing customers to continue using the services provided by the provider and/or to encourage potential customers in the same neighborhood to become customers.

Thus, there are further needs in the art for methods, apparatuses, systems, computer program products, and/or the like for tracking referrals and/or providing incentives, awards, discounts, and/or the like to users based on services contracted, referrals, and/or the like.

BRIEF SUMMARY OF SOME EXAMPLE EMBODIMENTS

According to an example embodiment, a user (e.g., a provider) may select and/or define one or more geographical areas in which the user provides one or more services. A user interface may be configured to display boundaries of the one or more geographical areas as a layer of map information/data by stitching together unique line segments (and/or portions thereof) defined by boundary information of constituent areas used to define the geographical area. In an example embodiment, customers located within a geographical area that contract, schedule, and/or the like to have one or more services performed by a provider may receive a discount, incentive, and/or the like based on the number of customers located within the geographical area that contract schedule, and/or the like to have one or more services performed by the provider. In an example embodiment, a user may refer a new user to establish a profile; access an application, website, online portal, and/or the like through which customers may contract, schedule, and/or the like with one or more providers to perform one or more services; and/or the like. The user that refers the new user and the new user may both receive a referral bonus, credit, and/or the like upon the completion of the first service corresponding to the new user. The referral bonus, credit, and/or the like provided to both the user who provided the referral and the new user may be determined based on a user type associated with the new user (e.g., customer or provider).

According to one aspect of the present invention, a method for rendering a geographical map for display is provided. In an example embodiment, the method comprises identifying, by at least one processor, one or more constituent areas associated with the geographical area responsive to receiving an indication of a geographical area. The method may further comprise accessing, by the at least one processor, boundary data corresponding to the one or more constituent areas. The boundary data for each constituent area comprises a plurality of geographical location points defining line segments that define the boundary of the corresponding constituent area. The method further comprises identifying, by the at least one processor, one or more unique portions of the line segments. Each unique portion of a line segment is defined within the boundary data of the one or more constituent areas and is defined by portions of line segments within the boundary data of only one of the one or more constituent areas. The method further comprises defining, by the at least one processor, a geographical area boundary layer. The geographical boundary layer comprises a set of line segments consisting of the one or more unique portions of the line segments. The method further comprises providing, by the at least one processor, a geographical map for display via an interface comprising a plurality of layers. The plurality of layers comprises one or more map layers and the geographical area boundary layer.

According to another aspect of the present invention, an apparatus is provided. In an example embodiment, the apparatus comprises at least one processor, at least one memory storing computer program code, and at least one user interface. The at least one memory and the computer program code are configured to, with the processor, cause the apparatus to at least identify one or more constituent areas associated with the geographical area responsive to receiving an indication of a geographical area. The at least one memory and the computer program code are further configured to, with the processor, cause the apparatus to at least access boundary data corresponding to the one or more constituent areas. The boundary data for each constituent area comprises a plurality of geographical location points defining line segments that define the boundary of the corresponding constituent area. The at least one memory and the computer program code are further configured to, with the processor, cause the apparatus to at least identify one or more unique portions of the line segments. Each unique portion of a line segment is defined within the boundary data of the one or more constituent areas and is defined by portions of line segments within the boundary data of only one of the one or more constituent areas. The at least one memory and the computer program code are further configured to, with the processor, cause the apparatus to at least define a geographical area boundary layer. The geographical boundary layer comprises a set of line segments consisting of the one or more unique portions of the line segments. The at least one memory and the computer program code are further configured to, with the processor, cause the apparatus to at least provide a geographical map for display via an interface comprising a plurality of layers. The plurality of layers comprises one or more map layers and the geographical area boundary layer.

According to yet another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to identify one or more constituent areas associated with the geographical area responsive to receiving an indication of a geographical area. The computer-executable program code instructions further comprise program code instructions configured to access boundary data corresponding to the one or more constituent areas. The boundary data for each constituent area comprises a plurality of geographical location points defining line segments that define the boundary of the corresponding constituent area. The computer-executable program code instructions further comprise program code instructions configured to identify one or more unique portions of the line segments. Each unique portion of a line segment is defined within the boundary data of the one or more constituent areas and is defined by portions of line segments within the boundary data of only one of the one or more constituent areas. The computer-executable program code instructions further comprise program code instructions configured to define a geographical area boundary layer. The geographical boundary layer comprises a set of line segments consisting of the one or more unique portions of the line segments. The computer-executable program code instructions further comprise program code instructions configured to provide a geographical map for display via an interface comprising a plurality of layers. The plurality of layers comprises one or more map layers and the geographical area boundary layer.

According to still another aspect of the present invention, a method for determining an incentive for a first customer based on a geographic location of a set of customers is provided. In an example embodiment, the method comprises accessing a first customer profile corresponding to the first customer and stored in a user profile database to determine a geographical area associated with the first customer profile. The first customer profile comprises a geographical area identifier configured to identify the geographical area associated with the first customer profile. In an example embodiment, the method further comprises identifying a set of one or more second customer profiles. A second customer profiles is a customer profiles that comprises a provider identifier configured to identify a service provider and the geographical area identifier. In an example embodiment, the method further comprises determining the number of second customer profiles in the set of second customer profiles. The one or more second customer profiles are stored in the user profile database. In an example embodiment, the method further comprises accessing an incentive table linked to the provider identifier; and based on the incentive table and the determined number, determining the incentive for the user.

In an example embodiment, the method further comprises facilitating a transaction associated with the first customer profile and the service provider based at least in part on the determined incentive. In an example embodiment, the method further comprises receiving a request for processing of a transaction associated with the first customer profile and the service provider. The request comprises a customer profile identifier configured to uniquely identify the first customer profile and the service provider identifier. The first customer profile is accessed responsive to receiving the request. In an example embodiment, the method further comprises receiving an incentive request. The incentive request comprises a customer profile identifier configured to uniquely identify the first customer profile and the service provider identifier. The first customer profile is accessed responsive to receiving the incentive inquiry. In an example embodiment, the second customer profile comprises information regarding at least one scheduled event and/or service corresponding to and/or to be performed by the service provider. In an example embodiment, the method further comprises providing an incentive notification. The incentive notification is received and processed by a user computing entity. The processing of the incentive notification causes information corresponding to the determined incentive to be displayed via a user interface of the user computing entity.

According to another aspect of the present invention, an apparatus is provided. In an example embodiment, the apparatus comprises at least one processor, at least one memory storing computer program code, and at least one user interface. The at least one memory and the computer program code are configured to, with the processor, cause the apparatus to at least access a first customer profile corresponding to the first customer and stored in a user profile database to determine a geographical area associated with the first customer profile. The first customer profile comprises a geographical area identifier configured to identify the geographical area associated with the first customer profile. In an example embodiment, the at least one memory and the computer program code are further configured to, with the processor, cause the apparatus to at least identify a set of one or more second customer profiles. A second customer profiles is a customer profiles that comprises a provider identifier configured to identify a service provider and the geographical area identifier. In an example embodiment, the at least one memory and the computer program code are further configured to, with the processor, cause the apparatus to at least determine the number of second customer profiles in the set of second customer profiles. The one or more second customer profiles are stored in the user profile database. In an example embodiment, the at least one memory and the computer program code are further configured to, with the processor, cause the apparatus to at least access an incentive table linked to the provider identifier; and based on the incentive table and the determined number, determine the incentive for the user.

In an example embodiment, the at least one memory and the computer program code are further configured to, with the processor, cause the apparatus to at least facilitate a transaction associated with the first customer profile and the service provider based at least in part on the determined incentive. In an example embodiment, the at least one memory and the computer program code are further configured to, with the processor, cause the apparatus to at least receive a request for processing of a transaction associated with the first customer profile and the service provider. The request comprises a customer profile identifier configured to uniquely identify the first customer profile and the service provider identifier. The first customer profile is accessed responsive to receiving the request. In an example embodiment, the at least one memory and the computer program code are further configured to, with the processor, cause the apparatus to at least receive an incentive request. The incentive request comprises a customer profile identifier configured to uniquely identify the first customer profile and the service provider identifier. The first customer profile is accessed responsive to receiving the incentive request. In an example embodiment, the second customer profile comprises information regarding at least one scheduled event and/or service corresponding to and/or to be performed by the service provider. In an example embodiment, the at least one memory and the computer program code are further configured to, with the processor, cause the apparatus to at least provide an incentive notification. The incentive notification is received and processed by a user computing entity. The processing of the incentive notification causes information corresponding to the determined incentive to be displayed via a user interface of the user computing entity.

According to yet another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to access a first customer profile corresponding to the first customer and stored in a user profile database to determine a geographical area associated with the first customer profile. The first customer profile comprises a geographical area identifier configured to identify the geographical area associated with the first customer profile. In an example embodiment, the computer-executable program code instructions further comprise program code instructions configured to identify a set of one or more second customer profiles. A second customer profiles is a customer profiles that comprises a provider identifier configured to identify a service provider and the geographical area identifier. In an example embodiment, the computer-executable program code instructions further comprise program code instructions configured to determine the number of second customer profiles in the set of second customer profiles. The one or more second customer profiles are stored in the user profile database. In an example embodiment, the computer-executable program code instructions further comprise program code instructions configured to access an incentive table linked to the provider identifier; and based on the incentive table and the determined number, determine the incentive for the user.

In an example embodiment, the computer-executable program code instructions further comprise program code instructions configured to facilitate a transaction associated with the first customer profile and the service provider based at least in part on the determined incentive. In an example embodiment, the computer-executable program code instructions further comprise program code instructions configured to receive a request for processing of a transaction associated with the first customer profile and the service provider. The request comprises a customer profile identifier configured to uniquely identify the first customer profile and the service provider identifier. The first customer profile is accessed responsive to receiving the request. In an example embodiment, the computer-executable program code instructions further comprise program code instructions configured to receive an incentive request. The incentive request comprises a profile identifier configured to uniquely identify the first customer profile and the service provider identifier. The first customer profile is accessed responsive to receiving the incentive request. In an example embodiment, the second customer profile comprises information regarding at least one scheduled event and/or service corresponding to and/or to be performed by the service provider. In an example embodiment, the computer-executable program code instructions further comprise program code instructions configured to provide an incentive notification. The incentive notification is received and processed by a user computing entity. The processing of the incentive notification causes information corresponding to the determined incentive to be displayed via a user interface of the user computing entity.

According to still another embodiment of the present invention, a method for adding a user to a network of users is provided. In an example embodiment, the method comprises providing first computer executable code to a first user computing entity. Execution of the first computer executable code causes a display device of the first user computing entity to provide a first user interface. In an example embodiment, the method further comprises receiving, as user input through the user interface, an electronic destination address corresponding to a second user, the user input associated with a first user profile; and generating a link and providing the link to the electronic destination address. In an example embodiment, the method further comprises, responsive to receiving a user selection of the link, providing second computer executable code to a second user computing entity. The user selection of the link is provided as user input to the second user computing entity. Execution of the second computer executable code by the second user computing entity causes a display device of the second user computing entity to provide a second user interface. In an example embodiment, the method further comprises receiving user profile information as user input to the second user interface. The user profile information comprises a user type. In an example embodiment, the method further comprises generating a second user profile based on the user profile information; receiving an request to process a transaction associated with the second user profile; and responsive to receiving the request, providing a first credit to the first user profile and a second credit to the second user profile, the first and second credits determined based on the user type.

In an example embodiment, the first and second credits are of the same value. In an example embodiment, the method further comprises, responsive to receiving the user profile information, determining whether a second user profile has previously been generated based on the user profile information. In an example embodiment, the user type is selected from the group consisting of customer and provider. In an example embodiment, at least a portion of the second credit is automatically applied to the processing of the transaction. In an example embodiment, execution of the second computer executable code causes the second user computing entity to (a) download and execute an application, the application configured to provide the second user interface or (b) access the second user interface via an online portal.

According to another embodiment of the present invention, an apparatus is provided. In an example embodiment, the apparatus comprises at least one processor and at least one memory storing computer program code. The at least one memory and the computer program code are configured to, with the processor, cause the apparatus to at least provide first computer executable code to a first user computing entity. Execution of the first computer executable code causes a display device of the first user computing entity to provide a first user interface. In an example embodiment, the at least one memory and the computer program code are further configured to, with the processor, cause the apparatus to at least receive, as user input through the user interface, an electronic destination address corresponding to a second user, the user input associated with a first user profile; and generate a link and providing the link to the electronic destination address. In an example embodiment, the at least one memory and the computer program code are further configured to, with the processor, cause the apparatus to at least, responsive to receiving a user selection of the link, provide second computer executable code to a second user computing entity. The user selection of the link is provided as user input to the second user computing entity. Execution of the second computer executable code by the second user computing entity causes a display device of the second user computing entity to provide a second user interface. In an example embodiment, the at least one memory and the computer program code are further configured to, with the processor, cause the apparatus to at least receive user profile information as user input to the second user interface. The user profile information comprises a user type. In an example embodiment, the at least one memory and the computer program code are further configured to, with the processor, cause the apparatus to at least generate a second user profile based on the user profile information; receive a request to process a transaction associated with the second user profile; and, responsive to receiving the request, provide a first credit to the first user profile and a second credit to the second user profile, the first and second credits determined based on the user type.

In an example embodiment, the first and second credits are of the same value. In an example embodiment, the at least one memory and the computer program code are further configured to, with the processor, cause the apparatus to at least, responsive to receiving the user profile information, determining whether a second user profile has previously been generated based on the user profile information. In an example embodiment, the user type is selected from the group consisting of customer and provider. In an example embodiment, at least a portion of the second credit is automatically applied to the processing of the transaction. In an example embodiment, execution of the second computer executable code causes the second user computing entity to (a) download and execute an application, the application configured to provide the second user interface or (b) access the second user interface via an online portal.

According to yet another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to provide first computer executable code to a first user computing entity. Execution of the first computer executable code causes a display device of the first user computing entity to provide a first user interface. In an example embodiment, the computer-executable program code instructions comprise program code instructions configured to receive, as user input through the user interface, an electronic destination address corresponding to a second user, the user input associated with a first user profile; and generate a link and providing the link to the electronic destination address. In an example embodiment, the computer-executable program code instructions further comprise program code instructions configured to, responsive to receiving a user selection of the link, provide second computer executable code to a second user computing entity. The user selection of the link is provided as user input to the second user computing entity. Execution of the second computer executable code by the second user computing entity causes a display device of the second user computing entity to provide a second user interface. In an example embodiment, the computer-executable program code instructions further comprise program code instructions configured to receive user profile information as user input to the second user interface. The user profile information comprises a user type. In an example embodiment, the computer-executable program code instructions further comprise program code instructions configured to generate a second user profile based on the user profile information; receive a request to process a transaction associated with the second user profile; and, responsive to receiving the request, provide a first credit to the first user profile and a second credit to the second user profile, the first and second credits determined based on the user type.

In an example embodiment, the first and second credits are of the same value. In an example embodiment, the computer-executable program code instructions further comprise program code instructions configured to, responsive to receiving the user profile information, determining whether a second user profile has previously been generated based on the user profile information. In an example embodiment, the user type is selected from the group consisting of customer and provider. In an example embodiment, at least a portion of the second credit is automatically applied to the processing of the transaction. In an example embodiment, execution of the second computer executable code causes the second user computing entity to (a) download and execute an application, the application configured to provide the second user interface or (b) access the second user interface via an online portal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
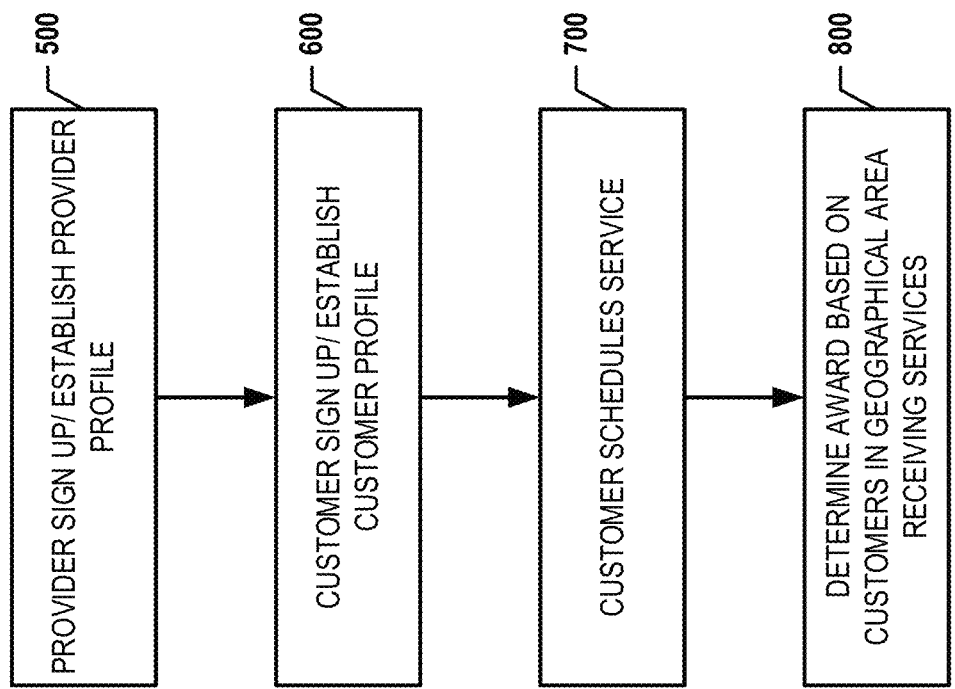

FIG. 4 provides a flowchart illustrating a high level overview providing services to a customer using through a platform provided by the services computing entity, in accordance with an example embodiment.

Figure 5:
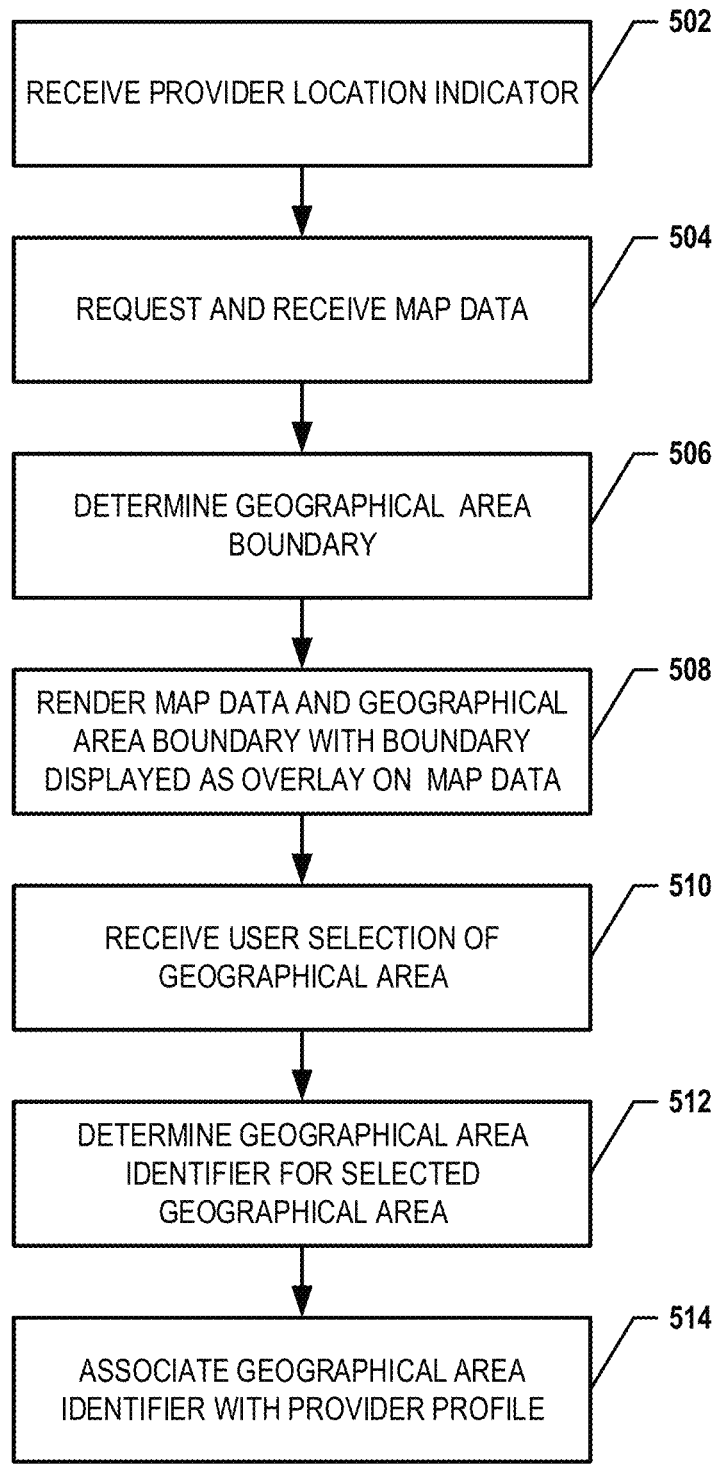
Figure 5A:

FIG. 5 provides a flowchart illustrating processes and procedures for a provider to select and/or define a geographical area in which the provider provides services, in accordance with an example embodiment.

FIGS. 5A, 5B, 5C, and 5D are example views of an example user interface for establishing a user as a provider, in accordance with an example embodiment.

Figure 6:
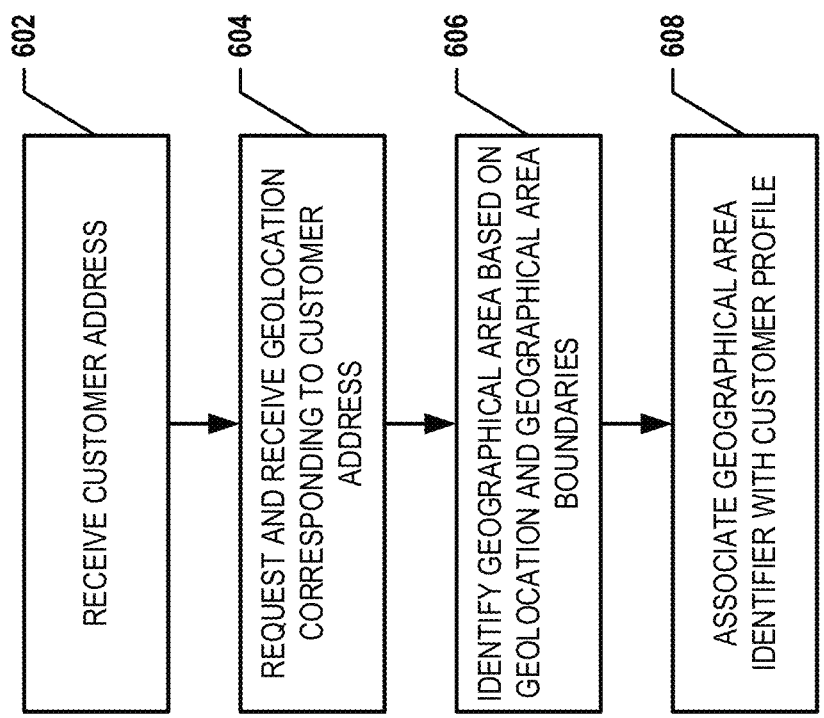

FIG. 6 provides a flowchart illustrating processes and procedures for associating a geographical area to a customer profile for a customer and/or potential customer, in accordance with an example embodiment.

Figure 6B:
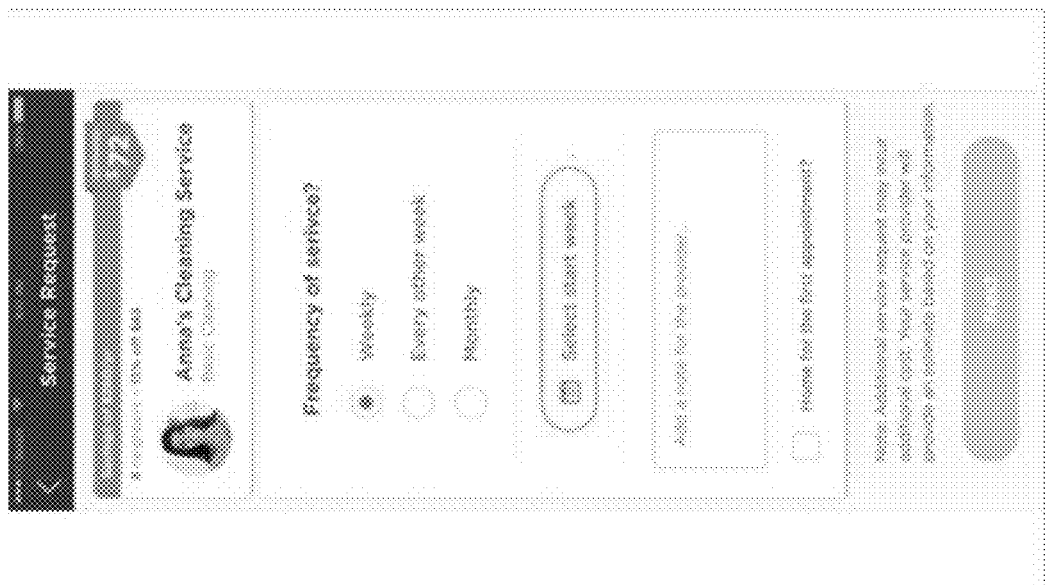
Figure 6A:
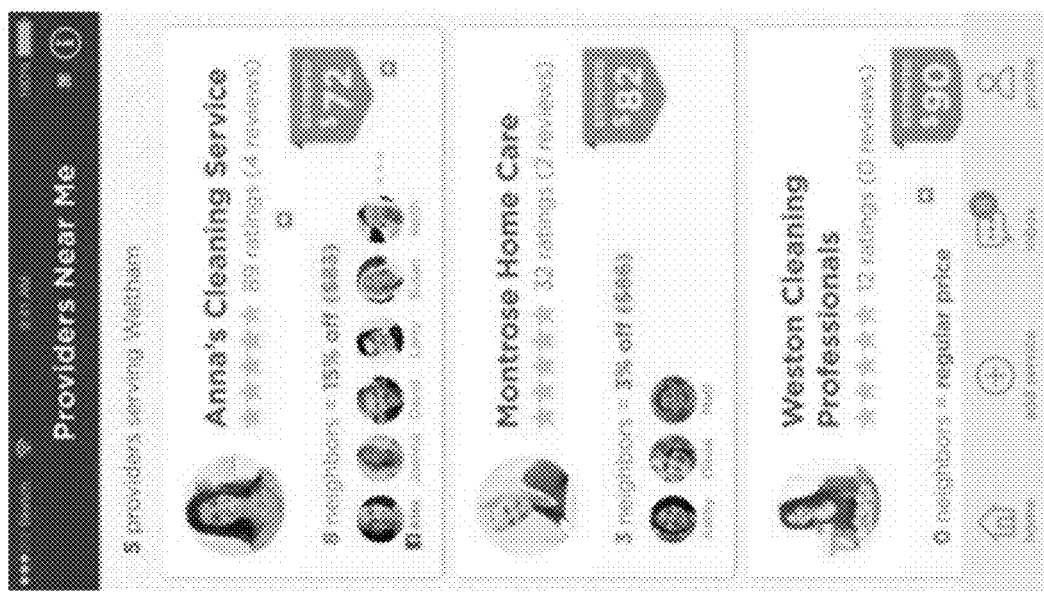

FIGS. 6A and 6B are example views of an example user interface for a customer to contract, schedule, and/or the like with a provider to have one or more services performed, in accordance with an example embodiment.

Figure 7:
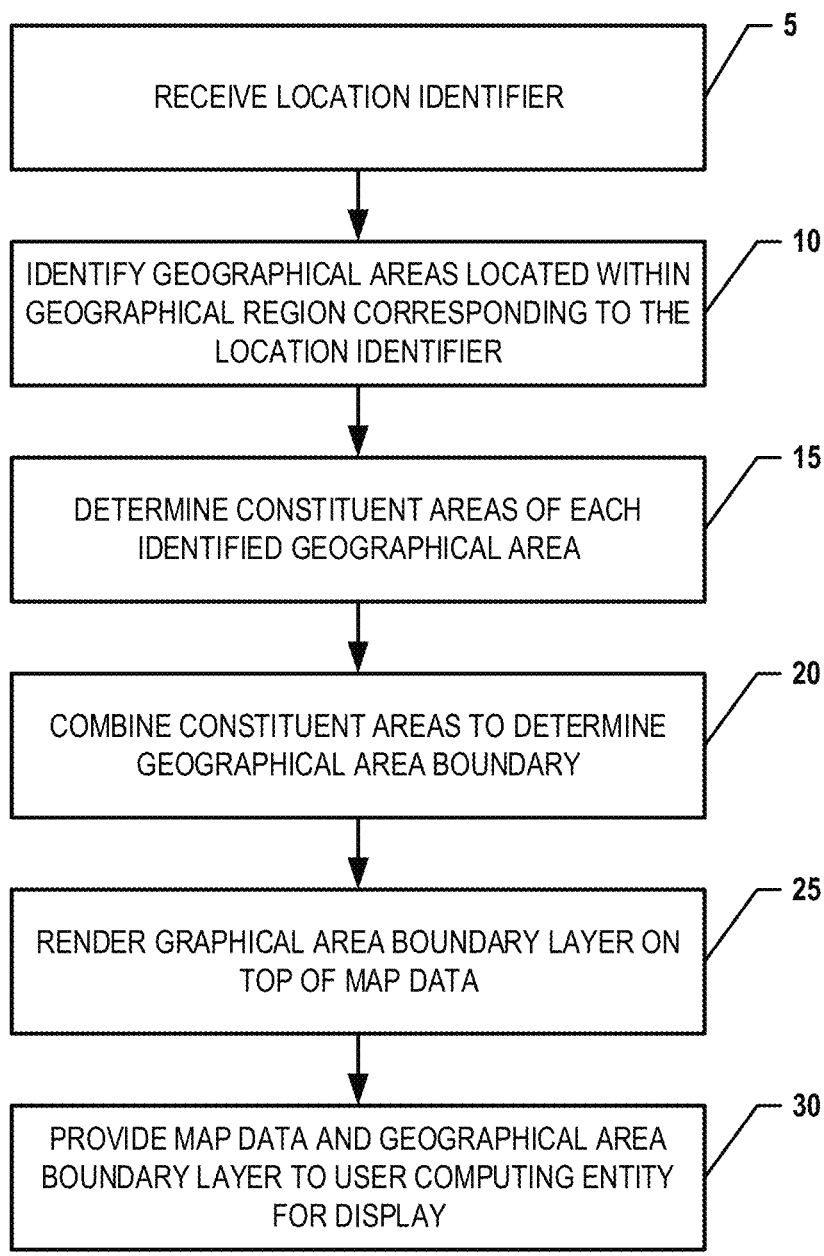

FIG. 7 provides a flowchart illustrating processes and procedures for a rendering a geographical area via a user interface, in accordance with an example embodiment.

Figure 7A:
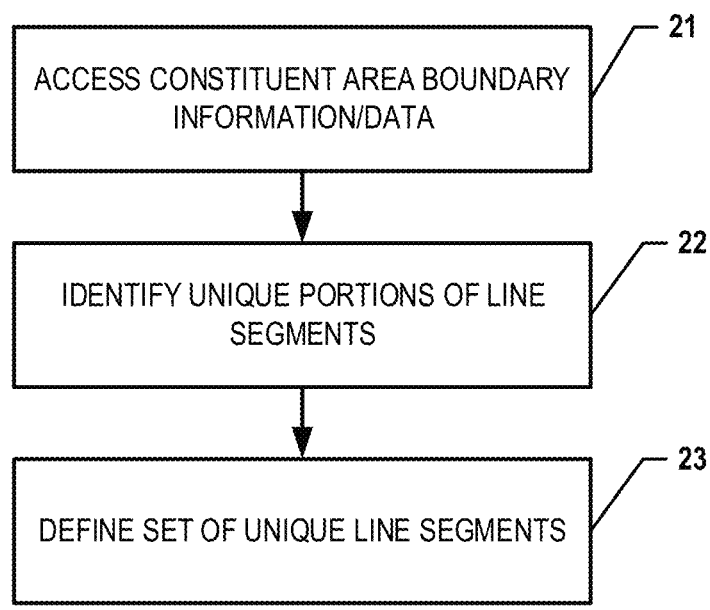

FIG. 7A provides a flowchart illustrating processes and procedures for combining constituent areas to define a geographical area, in accordance with an example embodiment.

FIG. 8 provides an example table that may be used, in one example embodiment, to identify the constituent areas corresponding to a geographical area.

Figure 9A:
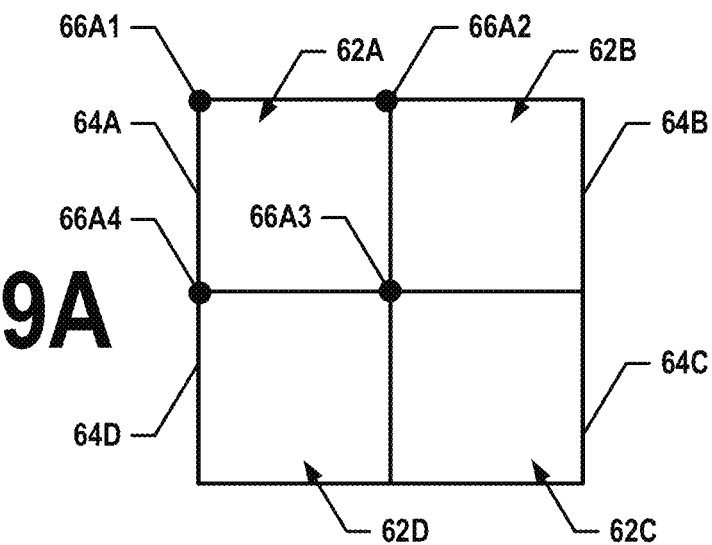
Figure 9B:
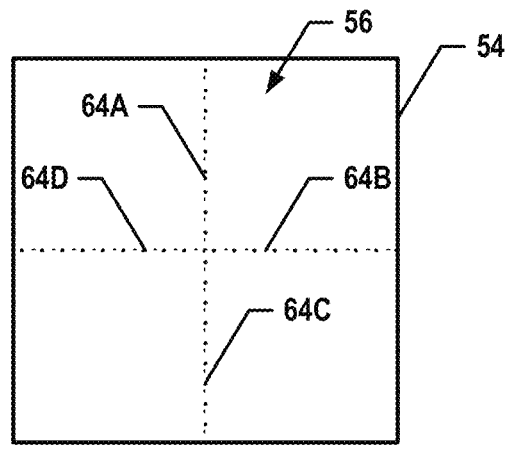

FIGS. 9A and 9B provide schematic representations of defining a geographical area for rendering the geographical area via a user interface, in accordance with an example embodiment.

Figure 9C:
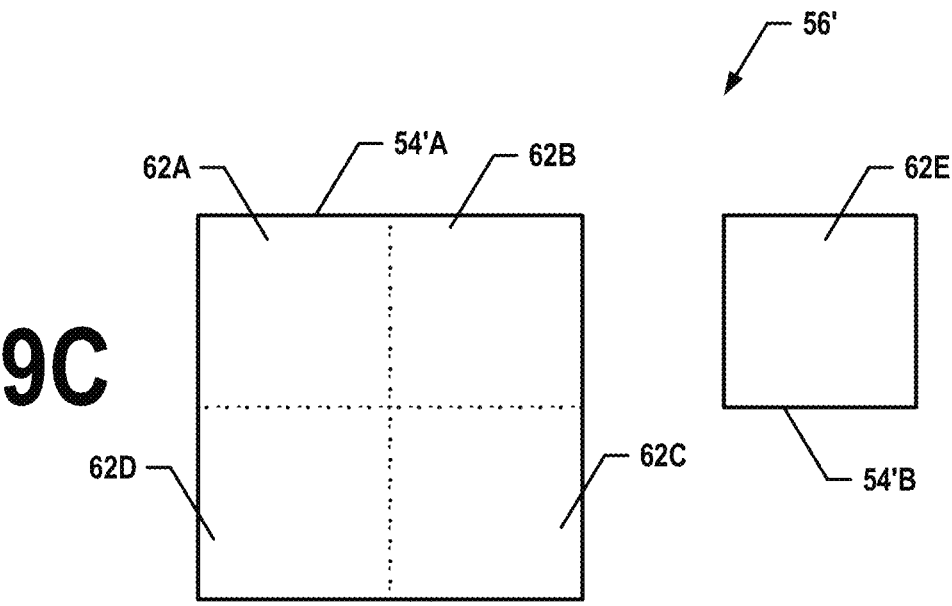

FIG. 9C provides a schematic representation of defining a geographical area for rendering the geographical area via a user interface when the constituent areas that make up the geographical area are not contiguous, in accordance with an example embodiment.

Figure 10:
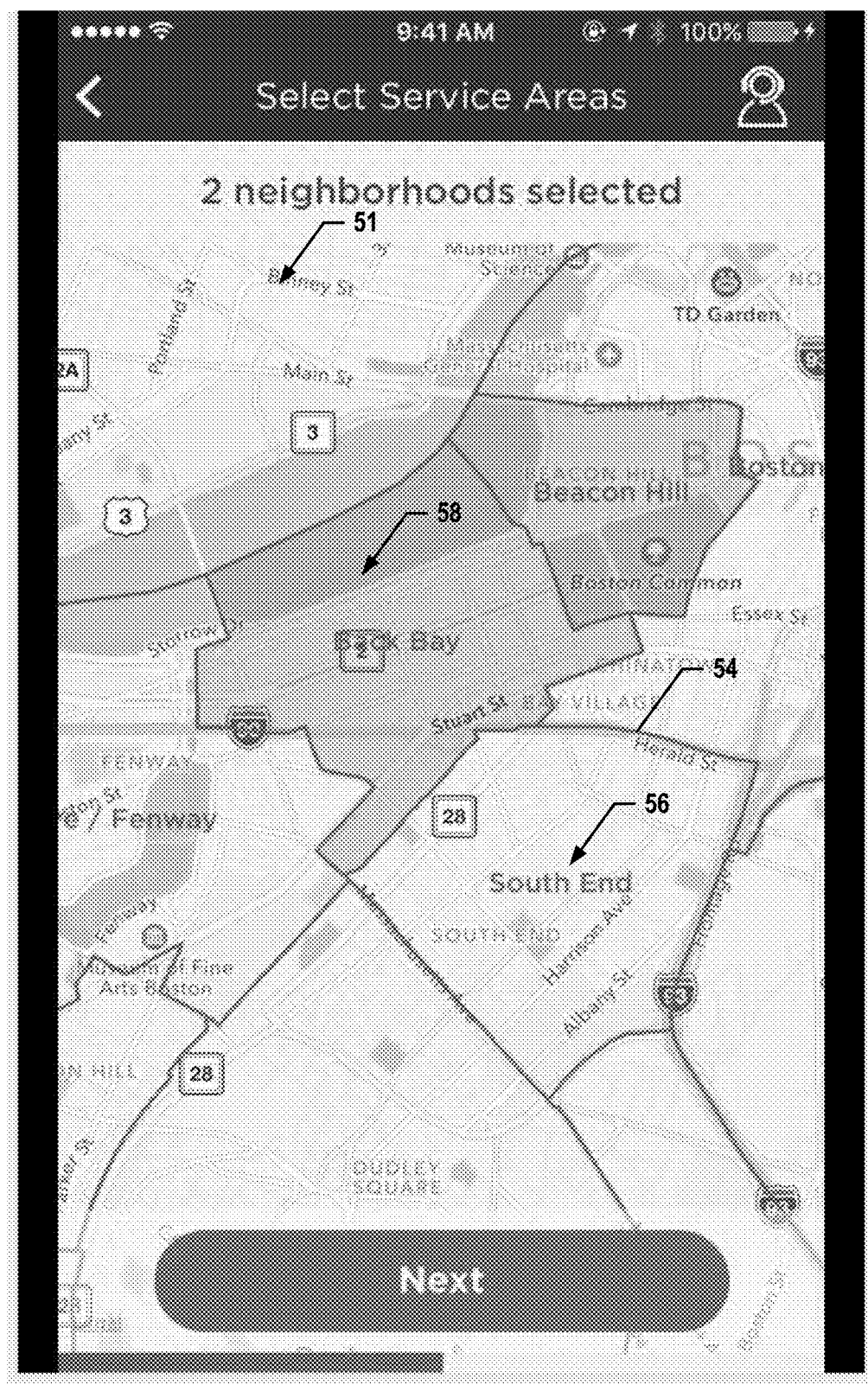

FIG. 10 is an example view of an example user interface displaying geographical boundaries over map information/data, in accordance with an example embodiment.

FIG. 11 provides a flowchart illustrating process and procedures for providing an incentive, award, discount, and/or the like to one or more customers, in accordance with an example embodiment.

Figure 11A:
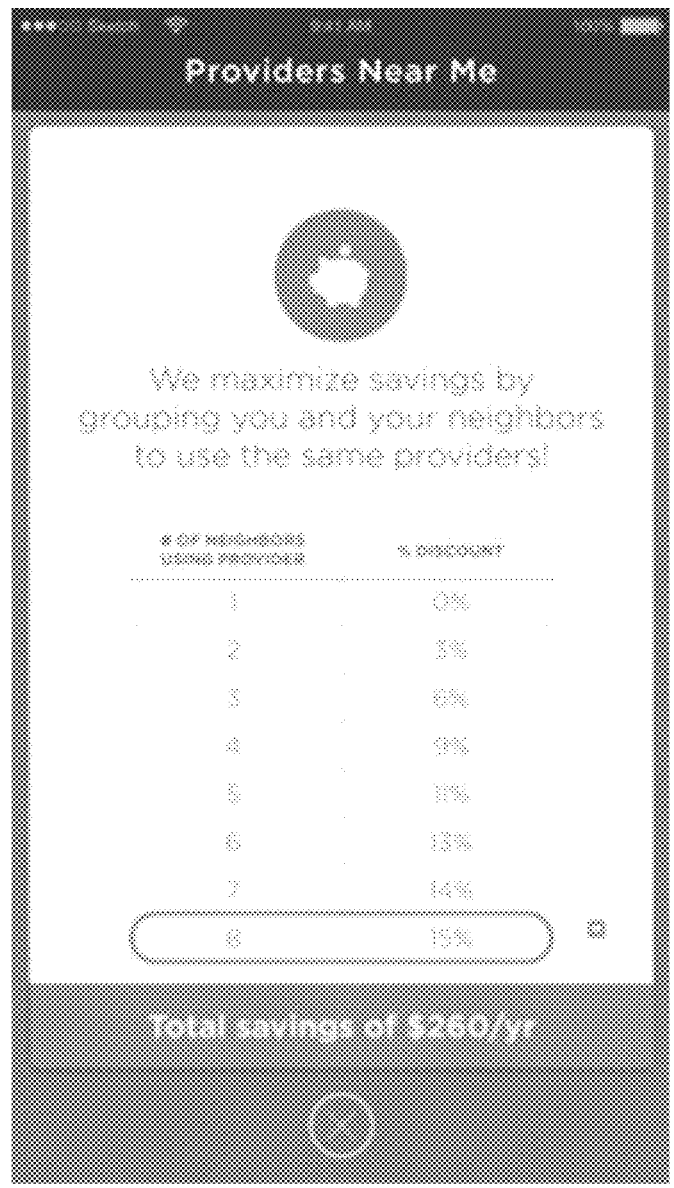

FIG. 11A is an example view of an example user interface providing a customer with a determined incentive, award, discount, and/or the like, in accordance with an example embodiment.

FIG. 12 provides a flowchart illustrating process and procedures for providing a referral credit to one or more customers, in accordance with an example embodiment.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like numbers refer to like elements throughout.

Embodiments of the present invention may provide users with a mobile computing based application and/or Internet based portal for offering and requesting services based on a geographical area (e.g., a city, neighborhood, and/or the like) in which the user is located (e.g., the location where the services is to be performed). In various embodiments, discounts, incentives, and/or the like may be provided to customers based on the number of customers in a particular neighborhood or geographical area contracting, scheduling, and/or the like with a service provider to have services performed. The terms service provider and provider are used interchangeably herein. Example embodiments track user (e.g., provider and/or customer) transactions to provide referral bonuses, credits, and/or the like. Some example embodiments of the present invention are directed to providing improved rendering of geographical areas and geographical area boundaries as an overlay on top of and/or as a layer of map information/data by performing real-time (or near real-time) merging of constituent area boundaries of various granularities to provide cohesive geographical areas. Each geographical area comprises one or more constituent areas to facilitate providing users (e.g., customers) with geographically based services and discounts, incentives, and/or the like for those services.

Various embodiments provide a technical solution to the technical problem of rendering a boundary of a geographical area for display by a user interface. For example, various embodiments improve computer-related technology by providing an efficient technique for rendering a boundary of a pre-defined and/or user-defined geographical area. Various embodiments provide a technical salutation to the technical problem of automatically determining a discount or incentive for a customer based on services that other customers have scheduled, contracted, and/or the like. For example, various embodiments improve computer-related technology by providing an automatic determination of an incentive for a first customer based on services scheduled, contracted, and/or the like by other customers. Further, various embodiments provide a technical solution to the technical problem of tracking user activity and providing a referral bonus, credit, and/or the like for a first/referring user and a second/referred user based on activity of the second/referred user. For example, various embodiments provide an improvement to computer-related technology by providing an automated technique for tracking user activity of a second/referred user and providing a referral bonus, credit, and/or the like to both a first/referring user and a second/referred user based on the activity of the second/referred user. Example embodiments of the present invention provide technical solutions to various other technical problems as described in more detail below.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
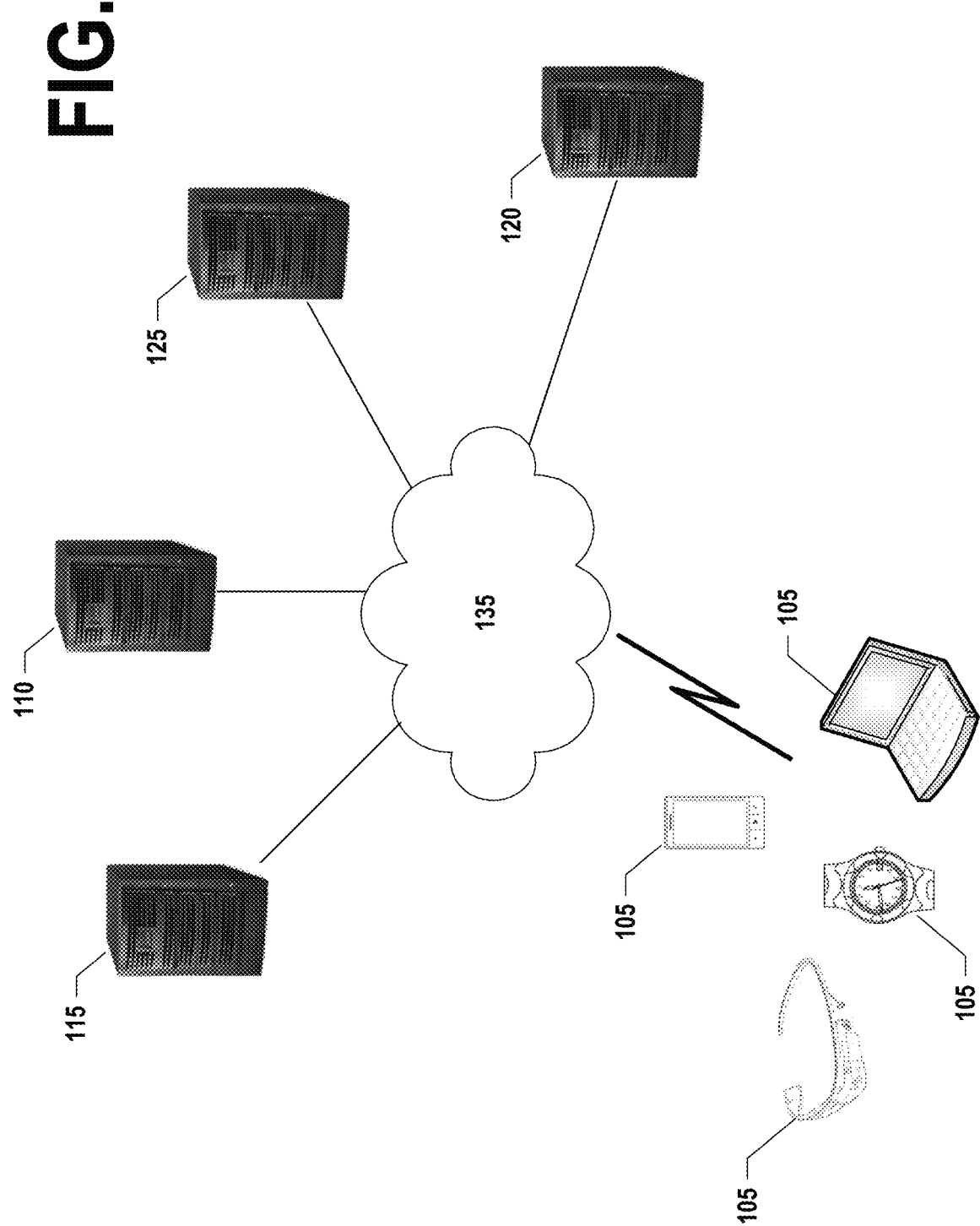
FIG. 1 is a diagram of a system that can be used to practice various embodiments of the present invention.

FIG. 1 provides an illustration of a system that can be used in conjunction with various embodiments of the present invention. As shown in FIG. 1, the system may include one or more user computing entities 105, one or more map provider computing entities 110, one or more external information/data computing entities 115, one or more services computing entities 120, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Services Computing Entity

Figure 2:
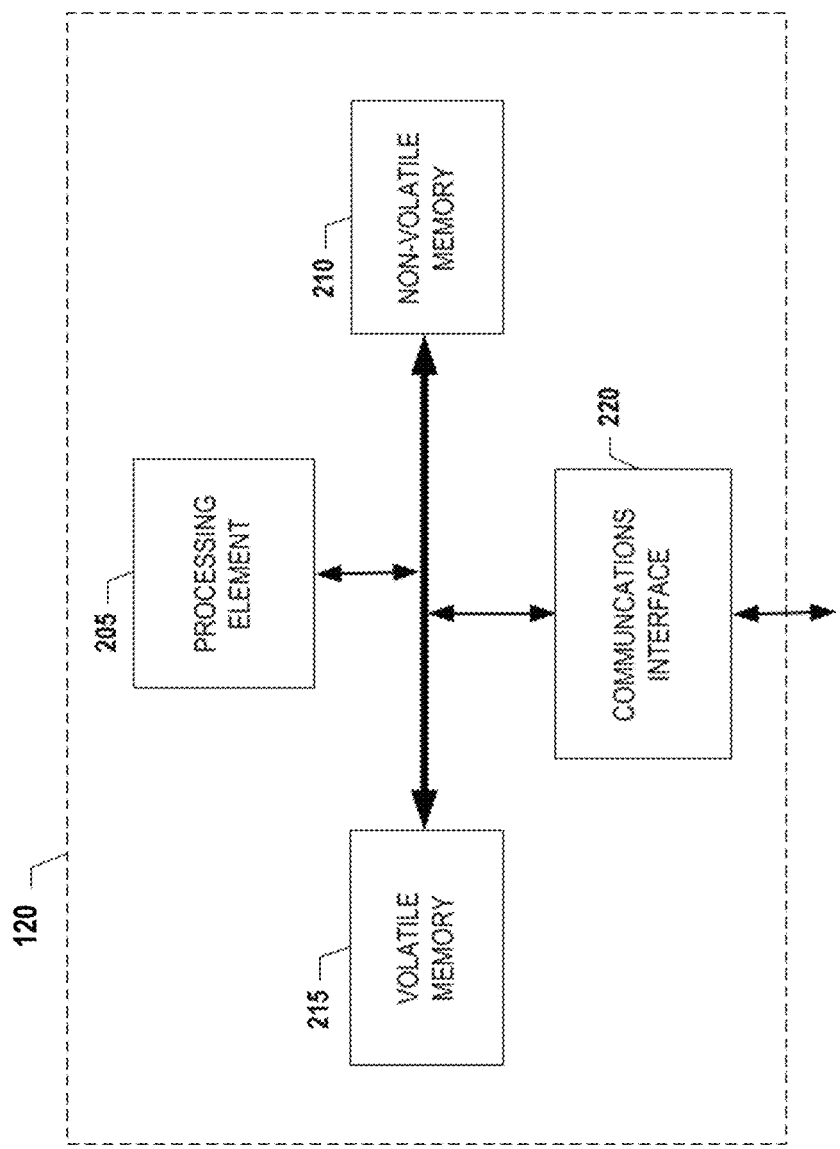
FIG. 2 is a schematic of a services computing entity in accordance with certain embodiments of the present invention.

FIG. 2 provides a schematic of a services computing entity 120 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, headsets, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the services computing entity 120 may also include one or more communications interfaces 220 for communicating with various computing entities, such as by communicating data, content, information, and/or similar terms used herein interchangeably that can be transmitted, received, operated on, processed, displayed, stored, and/or the like. For instance, the services computing entity 120 may communicate with user computing entities 105, map provider computing entities 110, external information/data provider computing entities 115, and/or the like.

As shown in FIG. 2, in one embodiment, the services computing entity 120 may include or be in communication with one or more processing elements 205 (also referred to as processors, processing circuitry, and/or similar terms used herein interchangeably) that communicate with other elements within the services computing entity 120 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the services computing entity 120 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database. For example, the services computing entity 120 may store a map information/data database, boundary information/data database, a user profile database, a customer profile database, a provider profile database, and/or other database(s).

In one embodiment, the services computing entity 120 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the services computing entity 120 with the assistance of the processing element 205 and operating system.

As indicated, in one embodiment, the services computing entity 120 may also include one or more communications interfaces 220 for communicating with various computing entities, such as by communicating data, content, information, and/or similar terms used herein interchangeably that can be transmitted, received, operated on, processed, displayed, stored, and/or the like. For instance, the services computing entity 120 may communicate with computing entities or communication interfaces of the user computing entity 105, map provider computing entity 110, external information/data provider computing entity 115, and/or the like.

As indicated, in one embodiment, the services computing entity 120 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the services computing entity 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The services computing entity 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like. In an example embodiment, a services computing entity 120 may communicate with one or more user computing entities 105, and/or other computing entities, via low energy Bluetooth, ZigBee, z-wave, or other short or long range communication protocol.

As will be appreciated, one or more of the services computing entity's 120 components may be located remotely from other services computing entity 120 components, such as in a distributed system. Furthermore, one or more of the components may be combined and additional components performing functions described herein may be included in the services computing entity 120. Thus, the services provider computing entity 120 can be adapted to accommodate a variety of needs and circumstances.

The services computing entity 120 may comprise a geographic information system (GIS) configured to access, process, and/or the like map information/data. For example, the services computing entity 120 may also include or have access to a map information/data database that includes a variety of data (e.g., map information/data) utilized for displaying a map, constructing a route or navigation path and/or other map related functions. For example, the services computing entity 120 may receive at least a portion of a geographic database comprising map information/data provided by a map provider computing entity 110. For example, a geographic database may include node data, road segment or link data records, point of interest (POI) data records, event of interest data records, serviceable point data records, and other data records. More, fewer or different data records can be provided. In one embodiment, the other data records include cartographic ("carto") data records, routing data, and/or the like. For example, the geographic database may comprise map information/data including boundary, location, and attribute information/data corresponding to the various serviceable points, POIs, events of interest, and/or the like.

One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or Global Navigation Satellite System (GNSS) and/or Global Positioning System (GPS) data associations (such as using known or future map matching, geo-coding, and/or reverse geo-coding techniques), for example. As will be recognized, the map information/data can be stored using a variety of formats, layers, and/or the like—including shapefiles, Arc-Maps, geodatabases, coverages, imagery, rasters, computer-aided drafting (CAD) files, other storage formats, and/or the like. For instance, the services computing entity 120 can appropriately store/record map information/data as a part of a digital map, e.g., as part of a feature layer, raster layer, service layer, geoprocessing layer, basemap layer, service are layer, constituent area layer, and/or the like.

In an example embodiment, the road segment data records are links or segments representing roads, streets, or paths. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates (e.g., latitude and longitude), street segment names or identifiers, street names, address ranges, speed limits, turn restrictions at intersections, and other navigation related attributes, as well as service points, events of interest, and/or POIs, such as gasoline stations, hotels, restaurants, museums, stadiums, offices, automobile dealerships, auto repair shops, buildings, stores, parks, etc. For example, serviceable points, events of interest, and/or POIs can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access serviceable points, events of interest, and/or POIs. Similarly, serviceable points, events of interest, POIs, street networks, and/or the like can be represented in digital maps as navigable/traversable/travelable segments or points for traveling to and/or from serviceable points, events of interest, and/or POIs.

The geographic database can include data about the serviceable points, events of interest, and/or POIs and their respective locations in the serviceable points, events of interest, and/or POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database. For example, in one embodiment, a serviceable point, event of interest, and/or POI may be represented by and/or associated with a longitude and latitude, a geocode, a nearest street segment, an address, and/or the like. As will be recognized, a variety of other approaches and techniques can be used to adapt to various needs and circumstances.

In one embodiment, the services computing entity 120 may store digital maps. In another embodiment, the services computing entity 120 may be in communication with or associated with one or more map or content provider computing entities 110 (e.g., mapping websites/servers/providers/databases, including providers such as maps.google.com, bing.com/maps, mapquest.com, Tele Atlas®, NAVTEQ®, and/or the like) that provide map information/data (or other content) of digital maps to a variety of users and/or entities. Using the digital maps, an appropriate computing entity can provide map information/data, for example, about serviceable points, events of interest, and/or POIs (e.g., their locations, attributes, and/or the like) and/or their corresponding street networks based on map information/data.

In one embodiment, the services computing entity 120 can identify and/or retrieve map information/data associated with serviceable points and/or geographic areas. A geographic area may be one or more residential blocks, sub-neighborhoods, neighborhoods, districts, constituent areas, geographical areas, roads, zip codes, area codes, cities, counties, states, provinces, countries, socio-culturally defined areas, politically defined areas, and/or other identifiable locations.

The geographic database can be maintained by the map or content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format, .kml, SQL, PostGIS, or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user computing entities or systems.

For example, geographic data is compiled (such as into a platform specification format (PSF) format) to organize and/or configure the data for performing various map related functions including map display, speed calculation, route calculation, distance and travel time functions, and other functions. For example, fusion tables and/or PostGIS software may be used to organize and/or configure the data for performing various map related functions. The compilation to produce the end user databases can be performed by a party or entity separate from the map developer. For example, a customer of the map developer, such as a navigation device developer or other end user computing entity developer, can perform compilation on a received geographic database in a delivery format to produce one or more compiled navigation databases.

b. Exemplary User Computing Entity

Figure 3:
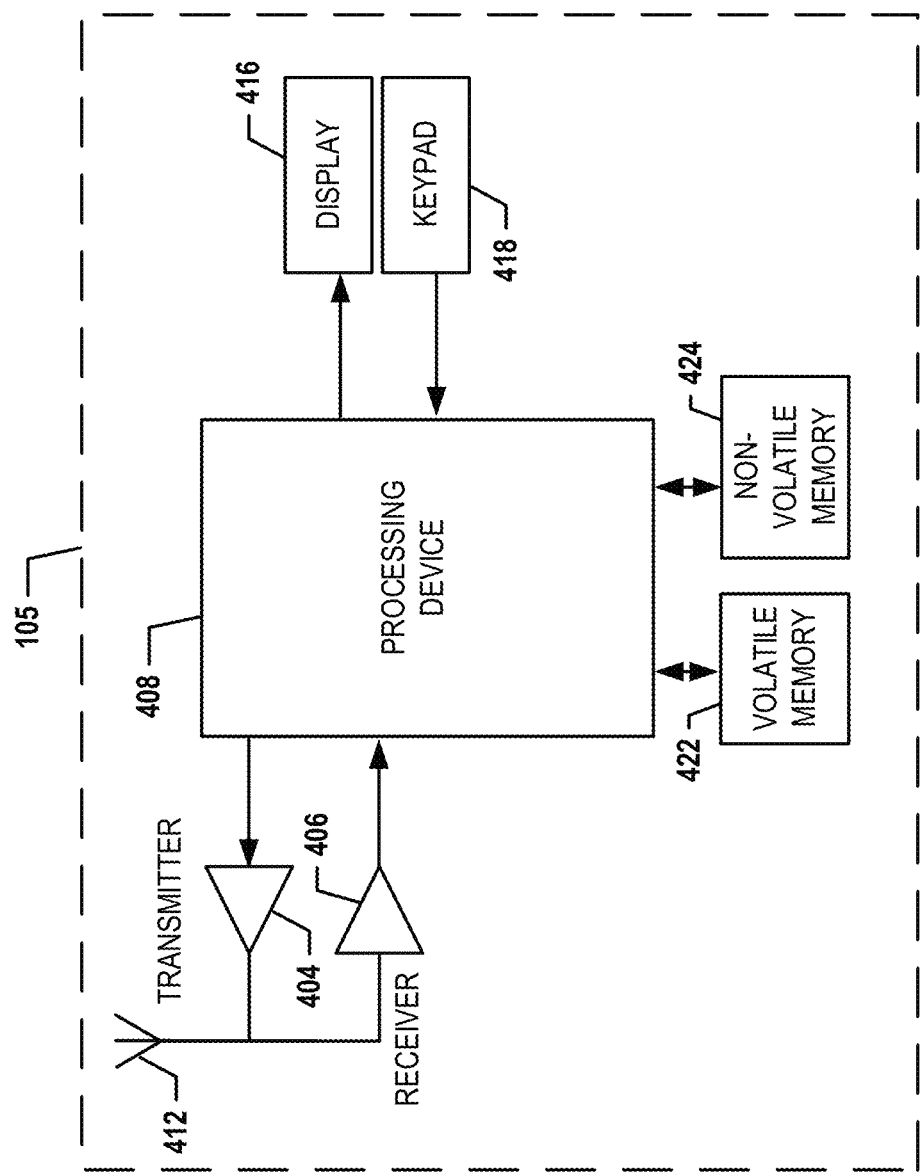
FIG. 3 is a schematic of a user computing entity in accordance with certain embodiments of the present invention.

FIG. 3 provides an illustrative schematic representative of a user computing entity 105 that can be used in conjunction with embodiments of the present invention. In one embodiment, the user computing entities 105 may include one or more components that are functionally similar to those of the services computing entity 120 and/or as described below. In general, a user computing entity 105 is a computing entity operated by and/or on behalf of a user. In various embodiments, a user may be a customer who contracts services from one or more providers through the platform provided by the services computing entity 120 and/or a potential customer looking to and/or considering contracting one or more services through the platform provided by the services computing entity 120. In various embodiments, a user may be a provider (also referred to as a service provider herein) who contracts and/or is looking to contract to perform one or more services through the platform provided by the services computing entity 120. For example, a user (e.g., customer, potential customer, and/or provider) may access an application provided and/or a website/portal hosted by the services computing entity 120 by operating the user computing entity 105.

As shown in FIG. 3, a user computing entity 105 can include an antenna 412, a transmitter 404 (e.g., radio), a receiver 406 (e.g., radio), and a processing element 408 that provides signals to and receives signals from the transmitter 404 and receiver 406, respectively. The signals provided to and received from the transmitter 404 and the receiver 406, respectively, may include signaling information/data in accordance with an air interface standard of applicable wireless systems to communicate with various entities, such as services computing entity 120, and/or the like. In this regard, the user computing entity 105 may be capable of operating with one or more air interface standards, communication protocols, modulation types, and access types. More particularly, the user computing entity 105 may operate in accordance with any of a number of wireless communication standards and protocols. In a particular embodiment, the user computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may include location determining aspects, devices, modules, functionalities, and/or similar words used herein interchangeably. For example, the user computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 105 position in connection with a variety of other systems, including cellular towers, Wi-Fi access points, and/or the like. Similarly, the user computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The user computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the user computing entity 105 to interact with and/or cause display of information. The user input interface can comprise any of a number of devices allowing the user computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity can collect contextual information/data as part of the telematics data.

The user computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 105. For example, the user computing entity 105 may store a map information/data database, a boundary information/data database, user (e.g., customer and/or provider) profile information/data, and/or other information/data corresponding to the platform provided by the services computer entity 120 within volatile storage or memory 422 and/or non-volatile storage or memory 424.

c. Exemplary Map Provider Computing Entity

In general, a map provider computing entity 110 is a computing entity operated by and/or on behalf of a map provider (e.g., an entity that provides map information/data, other content, and/or the like). For example, the map provider may be Google maps, Apple maps, Bing maps, and/or another map provider. In one embodiment, the map provider computing entity 110 may each include one or more components that are functionally similar to those of the services computing entity 120 and/or the user computing entity 105. For example, in one embodiment, each of the map provider computing entity 110 may include: (1) a processing element that communicates with other elements via a system interface or bus; (2) a user interface; (3) transitory and non-transitory memory; and (4) a communications interface. As previously noted, the map provider computing entity 110 may comprise a user interface. For example, the user interface may be an application, browser, user interface, dashboard, webpage, and/or similar words used herein interchangeably executing on and/or accessible via the map provider computing entity 110 to interact with and/or cause display of information/data from the services computing entity 120 and/or the user computing entity 105, as described herein. These architectures are provided for exemplary purposes only and are not limiting to the various embodiments.

The map provider computing entity 110 may also include or have access to a geographic database that includes a variety of data (e.g., map information/data) utilized for displaying a map, constructing a route or navigation path and/or other map related functions. For example, a geographic database may include node data, road segment or link data records, point of interest (POI) data records, event of interest data records, serviceable point data records, and other data records. More, fewer or different data records can be provided. In one embodiment, the other data records include cartographic ("cartel") data records, routing data, and/or the like. For example, the geographic database may comprise map information/data including boundary, location, and attribute information/data corresponding to the various serviceable points, POIs, events of interest, and/or the like.

One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching, geo-coding, and/or reverse geo-coding techniques), for example. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, the map provider computing entity 110 can appropriately store/record map information/data as a part of a digital map, e.g., as part of a feature layer, raster layer, service layer, geoprocessing layer, basemap layer, and/or the like.

In an example embodiment, the road segment data records are links or segments representing roads, streets, or paths. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates (e.g., latitude and longitude), street names, address ranges, speed limits, turn restrictions at intersections, and other navigation related attributes, as well as service points, events of interest, and/or POIs, such as gasoline stations, hotels, restaurants, museums, stadiums, offices, automobile dealerships, auto repair shops, buildings, stores, parks, etc. For example, serviceable points, events of interest, and/or POIs can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access serviceable points, events of interest, and/or POIs. Similarly, serviceable points, events of interest, POIs, street networks, and/or the like can be represented in digital maps as navigable/traversable/travelable segments or points for traveling to and/or from serviceable points, events of interest, and/or POIs.

The geographic database can include data about the serviceable points, events of interest, and/or POIs and their respective locations in the serviceable points, events of interest, and/or POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database. For example, in one embodiment, a serviceable point, event of interest, and/or POI may be represented by and/or associated with a longitude and latitude, a geocode, a nearest street segment, an address, and/or the like. As will be recognized, a variety of other approaches and techniques can be used to adapt to various needs and circumstances.

In one embodiment, the map provider computing entity 110 may store digital maps and/or provide digital maps to a services computing entity 120. Using the digital maps, an appropriate computing entity can provide map information/data, for example, about serviceable points, events of interest, and/or POIs (e.g., their locations, attributes, and/or the like) and/or their corresponding street networks based on map information/data.

In one embodiment, the map provider computing entity 110 can identify and/or retrieve map information/data associated with serviceable points and/or geographic areas. A geographic area may be one or more residential blocks, sub-neighborhoods, neighborhoods, constituent areas, geographical areas, roads, zip codes, area codes, cities, counties, states, provinces, countries, and/or other identifiable locations.

The geographic database can be maintained by the map or content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development of the map information/data. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user computing entities or systems.

For example, geographic data is compiled (such as into a platform specification format (PSF) format) to organize and/or configure the data for performing various map related functions including map display, speed calculation, route calculation, distance and travel time functions, and other functions. The compilation to produce the end user databases can be performed by a party or entity separate from the map developer. For example, a customer of the map developer, such as a navigation device developer or other end user computing entity developer, can perform compilation on a received geographic database in a delivery format to produce one or more compiled navigation databases.

d. Exemplary External Information/Data Computing Entity

In general, an external information/data computing entity 115 is a computing entity operated by and/or on behalf of an entity that provides information/data such as neighborhood and/or other geographical boundaries. For example, the external information/data computing entity 115 may provide neighborhood boundaries and/or other socio-cultural geographical boundaries to the services computing entity 120. In one embodiment, the external information/data computing entity 115 may each include one or more components that are functionally similar to those of the services computing entity 120 and/or the user computing entity 105. For example, in one embodiment, each of the external information/data computing entities 115 may include: (1) a processing element that communicates with other elements via a system interface or bus; (2) a user interface; (3) transitory and non-transitory memory; and (4) a communications interface. As previously noted, the external information/data computing entity 115 may comprise a user interface. For example, the user interface may be an application, browser, user interface, dashboard, webpage, and/or similar words used herein interchangeably executing on and/or accessible via the external information/data computing entity 115 to interact with and/or cause display of information/data from the services computing entity 120 and/or the user computing entity 105, as described herein. These architectures are provided for exemplary purposes only and are not limiting to the various embodiments. For example, in one embodiment, the external information/data computing entity 115 is embodied as a module of the map provider computing entity 110.

e. Payment Computing Entity

In general, a payment computing entity 125 is a computing entity operated by and/or on behalf of a financial entity that conducts financial transactions. For example, the payment computing entity 125 may be operated by and/or on behalf of a bank, automated clearing house (ACH), financial institution, and/or the like. For example, the payment computing entity 125 may be a computing entity configured for processing payments from customer users and providing payments to provider users for services (or goods) provided by provider users to customer users. In one embodiment, the payment computing entity 125 may each include one or more components that are functionally similar to those of the services computing entity 120 and/or the user computing entity 105. For example, in one embodiment, each of the payment computing entities 125 may include: (1) a processing element that communicates with other elements via a system interface or bus; (2) a user interface; (3) transitory and non-transitory memory; and (4) a communications interface. As previously noted, the payment computing entity 125 may comprise a user interface. For example, the user interface may be an application, browser, user interface, dashboard, webpage, and/or similar words used herein interchangeably executing on and/or accessible via the payment computing entity 125 to interact with and/or cause display of information/data from the services computing entity 120 and/or the user computing entity 105, as described herein. These architectures are provided for exemplary purposes only and are not limiting to the various embodiments.

Payments may be in a variety of forms, such as via debit cards, credit cards, direct credits, direct debits, cash, check, money order, Internet banking, e-commerce payment networks/systems (e.g., PayPal, Google Wallet, Amazon Payments), virtual currencies (e.g., Bitcoins), incentive or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Apple Pay, Leapset, Micros, PayPal Here, Revel, ShopKeep, TouchBistro, Vend, and/or the like.

f. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), metropolitan area networks (MANs), wide area networks (WANs), local area networks (LANs), or personal area networks. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

The services computing entity 120 is configured to provide an application for download onto and execution by a user computing entity 105 and/or a website, portal and/or the like accessible via the user computing entity 105 for use by one or more users. In example embodiments, a user may be a customer or a provider. For example, a user may access the application, website, portal and/or the like (e.g., via the user computing entity 105) to establish and/or generate a user profile (e.g., customer profile, provider profile), contract to perform services and/or to have services performed, complete transactions related to the performed services, and/or the like. In an example embodiment, the provider may select and/or define one or more geographical areas in which the provider offers to provide one or more services.

FIG. 4 provides an overview of providing users with a platform for contracting, scheduling, and/or the like to be a provider of services (e.g., perform one or more services) and/or to be a customer (e.g., have one or more services performed). In various embodiments, the platform may further provide functions for a provider to mark a contracted, scheduled, and/or the like service as complete and/or functions to facilitate, cause, and/or the like payment of the provider by the customer for the completed service. In various embodiments, the platform may be provided, maintained, administered, and/or the like by the services computing entity 120. In various embodiments, the services computing entity 120 may provide an application for download onto and execution by a user computing entity 105 and/or a website, portal and/or the like accessible via the user computing entity 105. Starting at block 500, one or more service providers may sign up to provide services. For example, a service provider (e.g., operating a user computing entity 105) may provide information/data regarding the service provider's identity; pre-defined and/or provider-defined geographical areas in which the service provider provides services; a list and/or description of services provided by the service provider; a price schedule, rate information, set of rates and/or the like for services; discounts provided by the service provider and/or the entity operating the services computing entity 120 (or the entity that the services computing entity 120 is being operated on behalf of) for multiple customers within a geographical area contracting and/or scheduling services with service provider; the billing and/or payment receiving information/data (e.g., financial account information for an account that payment for completion of a service should be deposited into); communicating with the provider (e.g., phone number, electronic destination address, and/or the like); and/or the like. The provided information/data may be stored in a service provider profile. The provider profile may be stored in a user profile database and/or a provider profile database stored by the services computing entity 120 (e.g., in memory 210, 215).

At block 600, a customer may sign up to access/receive services. For example a customer (e.g., operating a user computing entity 105) may provide information/data regarding the customer's identity, customer's address, payment information/data, information/data regarding services desired, information/data identifying services the customer is interested in having performed, information/data about the customer's home, lawn, and/or the like as pertains to services the customer is interested in contracting, scheduling, and/or the like (e.g., if the customer is interested in a lawn care service, the customer may provide information regarding the size, layout, how flat/sloped the lawn is, etc.), any promotional codes, and/or the like. The provided information/data may be stored in a user profile and/or a customer profile. In an example embodiment, the user profile and/or customer profile may be stored in a user profile database and/or a customer profile database stored by the services computing entity 120 (e.g., in memory 210, 215). The customer profile may be associated with a geographical area (e.g., a geographical area identifier configured to (uniquely) identify the first geographical area may be stored as part of the customer profile). The associated geographical area may be determined based at least in part on the customer address and/or the location at which the customer desires one or more services to be performed. In an example embodiment, the geographical area may be later used to determine one or more discounts for one or more services performed for the customer. In an example embodiment, a customer profile may comprise a customer or user identifier configured to uniquely identify the customer profile among the plurality of customer profiles and/or the plurality of user profiles. In an example embodiment, a customer profile may further comprise one or more provider identifiers corresponding to one or more providers that the customer has contracted, scheduled, and/or the like to have perform one or more services. A current relationship indicator may be associated with each provider identifier indicating whether the customer is currently contracted, scheduled, and/or the like with the provider to have one or more services performed.

In an example embodiment, provider profiles and customer profiles may be stored in a user database regardless of the user type (e.g., provider or customer). In an example embodiment, a user may be both a customer and a provider and the user type may be determined based on the transaction being considered. As used herein, a customer profile is a user profile corresponding to a customer and a provider profile is a user profile corresponding to a provider for a particular situation, actual transaction, and/or possible transaction. Similarly, a customer is a user that, for a particular situation, actual transaction, and/or possible transaction, is the receiver of the one or more services and a provider is a user that, for a particular situation, actual transaction, and/or possible transaction, is the provider and/or performer of the one or more services.

At block 700, the customer (e.g., operating a user computing entity 105) may schedule a service with a service provider providing services within the geographical area associated with the customer profile. For example, the customer (e.g., operating a user computing entity 105) may access at least a portion of the provider profile information/data and/or a scheduling function of the platform provided by the services computing entity 120, as provided through the application, website, portal, and/or the like, and schedule a service to be performed by the provider. Some non-limiting examples of services that a provider may offer include lawn care, house cleaning, interior and/or exterior painting, plumbing services, electrical services, handyman services, pet sitting services, pick up/delivery dry cleaning services, and/or the like. In an example embodiment, the customer profile comprises information/data that is relevant to the service to be performed (e.g., number and type of animals to be pet-sat, number of bedrooms and/or bathrooms in a home to be cleaned, size and layout of a yard to be mowed, and/or the like) and/or as part of the contracting, scheduling, and/or the like of the service the customer (e.g., operating a user computing entity 105) may provide input providing the information/data relevant to the service to be performed. The services computing entity 120 may use at least a portion of the information/data that is relevant to the service to be performed and one or more rates and/or rate information/data stored in association with a provider profile to determine an expected price, cost, and/or the like of a service.

At block 800, it may be determined if a discount, incentive, and/or the like provided to customers within a geographical area by the service provider and/or the entity operating the services computing entity 120 (or the entity that the services computing entity 120 is being operated on behalf of) based on the number of customers within the geographical area contracted and/or scheduled to receive services from the service provider should be provided. For example, the services computing entity 120 may determine a discount and/or incentive to be provided to customers contracted, scheduled, and/or the like to receive services from a provider and/or having pending transactions to pay for services performed by the provider based on the number of customers now receiving services from the service provider within the geographical area. For example, if 10 customers living with geographical area A are currently contracted to receive services from service provider X, a particular discount and/or incentive may be provided to those ten customers and a different (e.g., smaller) discount and/or incentive may be provided to the 5 customers living within geographical area B that are currently contracted to receive services from service provider X. In example embodiments, the services computing entity 120 may adjust the discount and/or incentive accordingly.

In an example embodiment, a customer (e.g., operating a user computing entity 105) may contract, schedule, and/or the like with a provider to have a service performed via the application, website, online portal, or other platform provided by the services computing entity 120. The customer and provider may communicate through the platform provided by the services computing entity 120 to contract, schedule, and/or the like the service and communicate any other information/data needed for the service to be performed (e.g., the customer may provide the provider with a gate code needed to enter a gated community within which the customer's home is located, and/or the like). The provider may then provide the service as scheduled, contracted, and/or the like. The provider (e.g., operating a user computing entity 105) may then access the application, website, online portal, or other platform provided by the services computing entity 120 to mark the service as complete. For example, the provider may provide information/data indicating the service had been completed. In an example embodiment, the customer may (e.g., in response to the services computing entity 120 receiving the service completion input from the provider operating a user computing entity 105) be prompted to provide input confirming the completion of a service (e.g., via an application, website, online portal, or other platform). For example, the services computing entity 120 may receive a communication from a user computing entity 105 operated by a provider indicating that the provider has marked a service as complete and, in response thereto, provide a push notification and/or the like to a user computing entity 105 operated by the customer associated with the service. In another example embodiment, an application operating on the user computing entity 105 may prompt the provider and/or customer corresponding to a service to provide input indicating the completion of the service at a time after the service was scheduled to be performed. For example, if a customer had scheduled to have his or her home cleaned on Tuesday, an application on the customer's user computing entity 105 may be configured to provide an alert (e.g., display, audibly provide, and/or the like) at 6 pm when the customer returns home to ask if the service had been completed. Thus, the services computing entity 120 may receive an indication from one or more user computing entities 105 that a services has been completed.

In response to receiving an indication from one or more user computing entities 105 that a service has been completed, the services computing entity 120 may facilitate, cause, and/or the like a transaction between the customer and the provider such that the customer provides payment to the provider for the completed service. For example, the services computing entity 120 may communicate with a payment computing entity 125 to facilitate and/or cause a transaction between the customer and the provider. In an example embodiment, the transaction may be modified based on a determined incentive, discount, and/or the like based on the number of customers within a geographical area currently contracted, scheduled, and/or the like to receive services from the provider. Various aspects of the present invention will now be described in more detail.

a. Geographical Areas Serviced by a Service Provider

In an example embodiments, neighborhoods, streets, districts, zones, zip codes, customer-focused areas, service provider-focused areas, and/or other socio-culturally defined areas (e.g., constituent areas) may be grouped into uniquely defined geographical areas that are easily selectable via an intuitive graphical interface display which overlays shaded boundary definitions on a map. In an example embodiment, a service provider may define one or more geographical areas by selecting one or more constituent areas to combine into a geographical area. In various embodiments, the geographical areas each comprise one or more constituent areas. The constituent areas may be defined by a third party, for instance, and may represent individual neighborhoods, streets, blocks, and/or other socio-culturally, politically, and/or geographically defined areas. Some constituent areas may be defined on a very granular level (e.g., on the street level). In some embodiments, some of the constituent areas may be defined on a less granular level (e.g., on a zip code level). The granularity of the constituent areas may, but not necessarily, be dependent on population density, road density, and/or the like. In an example embodiment, service providers can select or deselect geographical area(s) in which they wish to offer their services by tapping on (e.g., with a finger, stylus, and/or the like), clicking on (e.g., with a mouse and/or the like), using voice commands, or otherwise interacting with pre-defined geographical areas by using the graphical interface display. By tapping, clicking, using voice commands, and/or the like a geographical area via the graphical interface display, a service provider may indicate that he/she/it is willing to offer their/its service(s) and accept new customers that live in that particular geographical area. For example, as shown in FIG. 10, a user may tap, click, and/or otherwise select a geographical area via the graphical interface display (e.g. provided via the display 416 of the user computing entity 105) to select one or more geographical areas 56 in which a provider is willing to offer their/its service(s) and accept new customers that live and/or desire to have services performed in a selected geographical area 58. In example embodiments, the geographical areas may be defined such that any particular address is located in at most one geographical area.

In an example embodiment, a provider may select one or more constituent areas to define a geographical area. The provider may define one or more geographical areas in which he/she/it is willing to offer their/its service(s) and accept new customers. For example, a provider may define a first geographical area in which a first set of rates are charged for performing one or more services and a second geographical area in which a second set of rates are charged for performing the one or more services. For example, a provider (e.g., via the user interface of user computing entity 105) may select one or more constituent areas to define a geographical area. In an example embodiment, the provider defined geographical area may then be assigned a geographical area identifier. The geographical area identifier may then be stored in a table that links a geographical area name, geographical area identifier, and the corresponding constituent areas, such as the example table shown in FIG. 8. In an example embodiment, the services computing entity 120 may determine whether the provider-defined geographical area has been previously defined (e.g., by another provider or as a pre-defined geographical area) and assigned a geographical area identifier. If it is determined that the provider-defined geographical area has been previously defined and assigned a geographical area identifier, the geographical area identifier previously assigned to the provider-defined geographical area may be stored in association with the provider-provided rate information for that geographical area.

FIG. 5 provides a flowchart illustrating processes and procedures that may be used to receive the geographical areas serviced by a service provider. Starting at block 502, a location identifier may be received. For example, the services computing entity 120 may receive a location identifier. In some embodiments, the location identifier may be location information/data (e.g., a geolocation) indicating a current location of the user computing entity 105 being operated by the provider to establish the provider profile. The location information/data may be determined by a location sensor (e.g., GPS sensor) of the user computing entity 105. In various embodiments, the location identifier may be a city, state, zip code, a street address, zooming of a map, and/or other geographical location identified by user input to a user interface of a user computing entity 105 (or captured or collected in some other manner). The user interface may be provided by a dedicated application operating on the user computing entity 105 and/or a web browser or the like operating on the user computing entity 105 (e.g., through a website, online portal, and/or the like). For example, a user interface similar to that shown in FIG. 5A may be provided for a user to provide input comprising a location identifier.

For example, the services computing entity 120 may provide (e.g., transmit) first computer executable code configured to, when executed, cause a display device of the user computing entity 105 operated by the provider to provide a user interface. A user computing entity 105 may receive the first computer executable code and execute the first executable code. Execution of the first executable code by the user computing entity 105 may cause an application to be downloaded and/or to operate on the user computing entity 105, cause the first user computing entity 105 to access, display, and/or the like a website, online portal, and/or other platform provided by the services computing entity 120 and accessible via the user computing entity 105 to provide the user interface. The provider operating the user computing entity 105 may then provide the location identifier as input to the user interface (or the location identifier may be automatically determined by the user computing entity 105). The user computing entity 105 may then provide the location identifier to the services computing entity 120 such that the services computing entity receives the location identifier and/or the user computing entity 105 may otherwise process the location identifier (e.g., via the processing device 408).

Continuing with FIG. 5, at block 504, map information/data for an area in geographical proximity to the location identified by the location identifier may be requested and received. For example, the services computing entity 120 and/or user computing entity 105 may request and receive map information/data from the map provider computing entity 110. For example, if the location identifier is Boston, Mass., map information/data for the Boston metro area, western Massachusetts, western central New England, and/or the like may be requested and received or accessed. For example, in one embodiment, the map information/data may be requested and received in real time and/or near real time upon the processing of the location identifier by the services computing entity 120 and/or the user computing entity 105. In another example embodiment, the services computing entity 120 and/or user computing entity 105 may regularly, periodically, and/or as updates become available, receive updated map information/data from the map provider computing entity 110 and store the updated map information/data in a map information/data database stored by the services computing entity 120 (e.g., in memory 210, 215) and/or user computing entity 105 (e.g., in memory 422, 424).

Figure 5B:
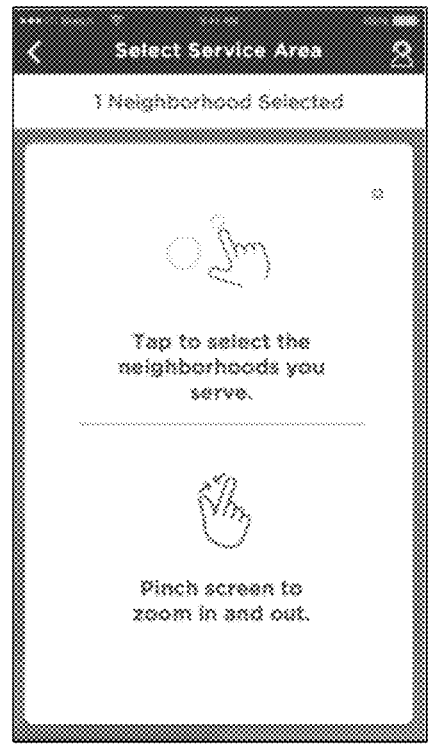

At block 506, geographical area boundary information/data may be accessed, identified, determined, and/or the like. For example, the services computing entity 120 may access, identify, determine, and/or the like geographical area boundary information/data for geographical areas located in the area in geographical proximity to the location identified by the location identifier. For example, the geographical area boundary information/data may be stored as part of the map information/data database, as a separate boundary information/data database (e.g., stored by the services computing entity 120 and/or user computing entity 105 and updated periodically, regularly, and/or as updates becomes available by the external information/data computing entity 115), and/or the like. In an example embodiment, the boundary information/data database (stored as a separate database and/or as part of the map information/data database) may comprise and/or be indexed by a table such as the example table illustrated in FIG. 8 that may be accessed to determine one or more constituent areas that are stitched together to form a geographical area. The constituent area boundary information/data for the one or more constituent areas stored as information/data instances in the boundary information/data database may be accessed to determine the boundary information/data for the corresponding geographical area, as described in more detail below. In an example embodiment, a boundary information/data database may comprise a plurality of indexing tables that are each associated with a particular zoom/detail level, such that geographical areas of various granularities may be provided based on the zoom/detail level at which map information/data is being and/or to be displayed via the user interface. FIG. 5B provides an example user interface that may be displayed to a user (e.g., by display 416 of the user computing entity 105) as the map information/data is accessed and rendered and the geographical area boundary information/data is accessed, determined, and/or the like and rendered. For example, a user interface may be provided that provides the user with instructions regarding how to select a geographical area, how to zoom the displayed map, and/or how to access different portions of the map.

Continuing with FIG. 5, at block 508, the map information/data and the geographical area boundary information/data are rendered to provide the geographical area boundary information/data as an overlay layer (e.g., geographical area layer and/or constituent area layer) on top of the map information/data. In various embodiments, layers are the mechanism used to display geographic datasets. Each layer references a dataset and specifies how that dataset is portrayed using symbols and text labels. For example, the map information/data is organized in layers, such as a feature, layer, a raster layer, a service, layer, a geoprocessing layer, a basemap layer, a traffic layer, a boundary layer, a street layer, a grid layer, a border layer, a tiled layer, a vector layer, a road layer, a river and stream layer, a political boundaries layer, a building footprint layer, an ortho-photography layer, and/or the like (each of which may be referred to individually or collective as a map layer or map data layer). Thus, displaying the map information/data may comprise accessing the map information/data and rendering one or more layers of map information/data. For example, different types of map information/data (roadways, rivers/lakes/streams, points of interest, building footprints, satellite imagery, and/or the like) may be rendered and displayed as different layers of the map displayed by display 416 of the user computing entity 105. For example, displaying a map may comprise displaying a plurality of layers, wherein at least some of the layers are map information/data layers configured to graphically represent map information/data. Thus, the geographical boundary information/data layer may be an additional layer that is rendered and/or displayed on top of various other map information/data layers. In an example embodiment, the geographical boundary information/data layer may be rendered and/or displayed as the top layer of the map and may be displayed in a transparent and/or semi-transparent manner, such that a user may view other map information/data layers of the map through the geographical boundary information/data layer. In an example embodiment, a geographical boundary information/data layer may comprise line segments defining the boundary of a plurality of geographical areas. In an example embodiment, a geographical boundary information/data layer may comprise line segments defining only one geographical area and a plurality of geographical boundary information/data layers may be displayed to provide the geographic map to the user (e.g., via the display 416).

Figure 5C:
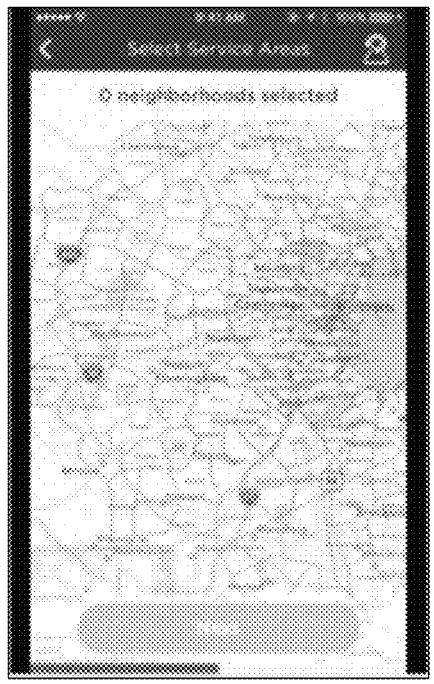
Figure 5D:
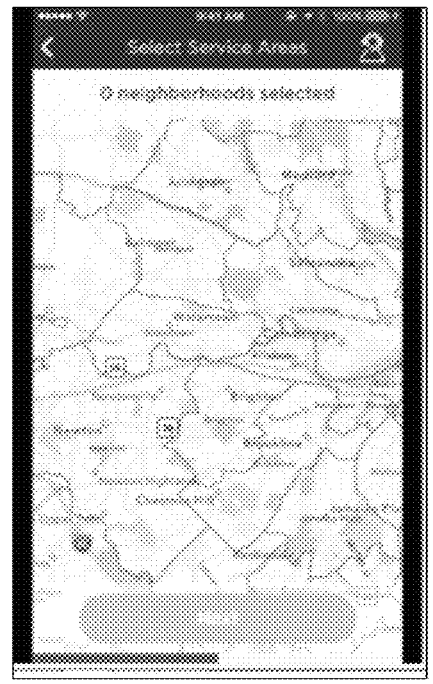

For example, the user computing entity 105 and/or the services computing entity 120 may render the map information/data and the geographical area boundary information/data. The geographical area boundary information/data may be configured such that geographical areas of various granularities may be provided (e.g., based on the zoom/detail level of the displayed map, and/or the like) and such that constituent areas defined at differing granularities may be cohesively provided to a user. For example, if a user is zoomed in on Boston, Mass., various geographical areas within Boston may be shown. For example, North End, Downtown Boston, West End, Chinatown/Leather District, and Bay Village may be shown as distinct geographical areas and/or combined to be shown as a single geographical area of Boston. For example, FIG. 5C shows an example user interface of the present invention (e.g., displayed via the display 416 of the user computing entity 105) in which the map is shown from a fairly zoomed out perspective and FIG. 5D shows an example user interface (e.g., displayed via the display 416 of the user computing entity 105) in which the map is shown from a relatively zoomed in perspective. The boundary of the single geographical area of Boston, defined by the union of constituent areas North End, Downtown Boston, West End, Chinatown/Leather District, and Bay Village, may be composed of the exterior (e.g., non-overlapping) boundaries of the constituent areas. For example, the geographical area boundary information/data may be displayed as an overlay layer (e.g., geographical area layer and/or constituent area layer) on top of the map information/data by a graphical interface display of the user computing entity (e.g., displayed by the display 416). In an example embodiment, rendering the geographical area boundary comprises displaying a line in a layer of the map information/data indicating the location of the geographical area boundary with respect to the map information/data via the user interface. The user (e.g., operating the user computing entity 105) may scroll, zoom, and/or the like the map displayed by the graphical interface display (e.g., displayed by display 416) and the displayed boundaries of the geographical areas may scroll, zoom, and/or the like in accordance with the displayed map. Thus, in example embodiments, geographical areas may be defined at a predetermined level of granularity and displayed in the graphical interface display (e.g., displayed by a display 416 of a user computing entity 105) for user interaction therewith.

At block 510, user selection of one or more geographical areas may be received. For example, the provider (e.g., operating a user computing entity 105) may select (e.g., tap, click, input via voice, eye contact, and/or other user computing entity enabled selection technique) one or more geographical areas. The selection may then be provided to the services computing entity 120 such that the services computing entity 120 receives the user selection. For example, the provider (e.g., operating a user computing entity 105) may tap, click, input via voice, and/or the like the map within the area bounded by the boundary of the selected geographical area. If the provider (e.g., operating the user computing entity 105) taps, clicks, input via voice, and/or the like the map within the area bounded by the boundary of an already selected geographical area, the geographical area may be un-selected.

For example, if the display 416 is a touchscreen display, the provider may tap the touchscreen display within an area bounded by the boundary of the selected geographical area. The touchscreen display may sense and/or receive the tap and provide the processing device 408 with an indication of where on the touchscreen display the tap was sensed and/or received. The processing device 408 may, based on the rendering of the map information/data and/or the rendering of the geographical area boundaries via the display 416, determine and/or identify the selected geographical area within which the tap was sensed and/or received. The processing device 408 may then store an indication (e.g., in the memory 422, 424) indicating the provider's selection of the selected geographical area and cause the display 416 to modify the display of the map information/data. For example, a selected geographical area layer that is transparently and/or semi-transparently displayed on top of the map information/data and/or the boundary information/data may be added and/or modified to show the selected geographical area as shaded, and/or the like. As should be understood, a similar technique may be used for non-touchscreen displays in which a user may use a mouse and/or the like to click and/or otherwise select a location on the display corresponding to a geographical area in order to select/de-select a geographical area.

In example embodiments, the graphical interface display (e.g., displayed by display 416 of the user computing entity 105) may provide real-time (or near real-time) feedback regarding service provider selection of one or more geographical areas. For example, when a service provider taps, clicks, and/or the like within the boundary of a geographical area, the display of the geographical area may be changed to display the geographical area as shaded. For example, an additional map layer (e.g., the selected geographical area map layer) may be updated in real-time (or near real-time) and comprise shaded areas of the map corresponding to geographical areas that have been selected by the service provider (e.g., operating the user computing entity 105). For example, the shaded areas of the map corresponding to selected geographical areas may be defined by the boundary of the corresponding geographical area. Thus, the service provider may scroll, zoom, and/or the like the map displayed by the graphical interface display (e.g., displayed by display 416) and the shading of the selected geographical areas may be maintained as appropriate for the updated (e.g., scrolled, zoomed, and/or the like) view of the map. In various embodiments, the user may select one or more geographical areas and then select a submit button to submit the selected geographical areas to the services computing entity 120.

At block 512, a geographical area identifier may be determined, identified, and/or accessed for each of the selected one or more geographical areas. For example, the services computing entity 120 (or the user computing entity 105) may determine a geographical area identifier for each of the provider-selected one or more geographical areas. For example, each geographical area may be associated with a geographical area identifier configured to (uniquely) identify the corresponding geographical area. In an example embodiment, when the processing device 408 determines and/or identifies the selected geographical area within which a tap, click, input via voice, and/or the like is sensed and/or received (e.g., indicating user selection of a geographical area) the geographical area identifier for the provider-selected geographical area may be determined and/or identified and stored in the memory 422, 424. When the provider selects the submit button to store the provider's selected geographical areas, the geographical area identifiers for the provider-selected geographical areas may be accessed from the memory.

At block 514, the geographical area identifier for each of the provider-selected geographical areas is stored in association with the provider profile. For example, the user computing entity 105 may provide (e.g., transmit) the geographical area identifiers for the provider-selected geographical areas. For example, the services computing entity 120 may receive the provided geographical area identifiers and store the geographical area identifier for each of the selected geographical areas in association with the provider profile. For example, the provider profile may contain a field to indicate the geographical areas for which the provider provides services. This field may be populated by the geographical area identifiers for each of the selected geographical areas. In an example embodiment, a provider may provide different rates for one or more services, wherein a first rate may be charged in a first geographical area and a second rate may be charged in a second geographical area. In such an embodiment, the provider profile may be updated to link the geographical area identifier to a particular set of geographical area dependent rates.

b. Associating a Geographical Area with a Customer Profile

FIG. 6 provides a flowchart illustrating various processes and procedures that may be used to associate a customer profile with a geographical area. Starting at block 602, the customer (e.g., operating a user computing entity 105) may enter a customer address (e.g., a location at which one or more services are to be performed). Thus, the services computing entity 120 may receive a customer address (e.g., street address, geo-code, and/or the like). The customer address may be stored in association with the customer profile. In other embodiments, the user may be asked to select the location of his or her home on a map, asked if he or she is at home and then access geolocation information for the current location of the customer (e.g., determined by a GNSS/GPS sensor and/or the like of the user computing entity 105), and/or the like. In an example embodiment, a home address and/or geolocation may be automatically determined for the customer (e.g., based on information/data stored on and/or accessible to the user computing entity 105, using a GNSS/GPS sensor, and/or the like).

At block 604, a geolocation corresponding to the customer address is determined. For example, the services computing entity 120 may request that the customer address be geo-coded and receive a geolocation for the customer address. For example, the services computing entity 120 provide request that the map provider computing entity 110 provide a geolocation for the customer address and receive the geolocation from the map provider computing entity 110. In another example embodiment, the services computing entity 120 and/or user computing entity 105 may perform the geo-coding based on a map information/data database stored thereby.

At block 606, the geolocation corresponding to the customer address is mapped or matched to a geographical area. For example, the services computing entity 120 may map or match the geolocation corresponding to the customer address to a geographical area. For example, based on one or more geographical area boundaries, it may be determined which geographical area the geolocation corresponding to the customer address is located within. For example, the boundaries of one or more geographical areas may be used to determine or identify the geographical area corresponding to the geolocation corresponding to the customer address. For example, as described in more detail elsewhere herein, one or more constituent areas corresponding to a geographical area may be identified. The boundary information/data for the identified one or more constituent areas may be accessed and the boundaries of the one or more constituent areas may be stitched together to define the geographical area boundary. For example, the non-overlapping portions of the constituent area boundaries may be used to define the geographical area boundary. Based on the geographical area boundaries of one or more geographical areas, it may be determined which geographical area the customer's address is located within. In another example embodiment, the constituent area boundaries may be used to determine which constituent area the customer's address is located in and a table similar to that shown in FIG. 8 may be used to determine which geographical area corresponding to the constituent area in which the customer's address is located. Thus, the services computing entity 120 and/or the user computing entity 105 may determine, identify, and/or associate a geographical area to the customer's address At block 608, the geographical area in which the customer address is located is associated with the customer profile. For example, the services computing entity 120 may associate the geographical area in which the customer address is located with the customer profile. For example, the geographical area identifier corresponding to the geographical area where the customer address is located may be stored in association with and/or as part of the customer profile. For example, the customer profile may comprise a field for indicating the geographical area associated with the customer or the customer's home or service location. This field may be populated with the geographical area identifier for the geographical area where the customer's address is located.

After a customer finishes the profile generation process, a customer may search and/or browse provider profiles and schedule one or more services with one or more service providers. For example, FIG. 6A shows an example user interface displayed to a customer (e.g., via the display 416 of the user computing entity 105) in response to the customer indicating that he/she is interested in scheduling a one or more services to be performed by a provider performing home cleaning services. After selecting a provider, the customer may be provided with a user interface (e.g., via the display 416 of the user computing entity 105), similar to the example user interface shown in FIG. 6B, through which the customer may contract and/or schedule with the selected provider to have the selected provider perform one or more services.

c. Determining Geographical Area Boundaries

In various embodiments, the geographical areas each comprise one or more constituent areas. The constituent areas may be defined by a third party (e.g., operating the external information/data computing entity 115), for instance, and may represent individual neighborhoods, streets, blocks, and/or other socio-culturally, politically, and/or geographically defined areas. In an example embodiment, a provider may define one or more geographical areas based on one or more constituent areas. Some constituent areas may be defined on a very granular level (e.g., on the street level). In some embodiments, some of the constituent areas may be defined on a less granular level (e.g., on a zip code level). The granularity of the constituent areas may be, but are not necessarily, dependent on population density, road density, and/or the like. For example, the one or more constituent areas that comprise the Boston, Mass., geographical area may be more granularly defined than the one or more constituent areas that comprise the Billerica, Mass. geographical area. The third party information/data provided by the external information/data computing entity 115 may comprise information/data defining each of the constituent areas. In example embodiments, the definitions of the constituent areas may change and/or be updated regularly, periodically, and/or as necessary to reflect the current socio-cultural boundaries and/or the like of the constituent areas. In example embodiments, the services computing entity 120 may request, receive, and/or access more than one data set defining constituent areas from the external information/data computing entity 115. For example, two data sets defining constituent areas (e.g., defining the boundaries of constituent areas) may be received and/or accessed from the external information/data provider computing entity 115. The data sets may be overlapping or non-overlapping. In various embodiments, these constituent areas and data sets can be touching together or completely separate but still considered as part of the same geographical area. For example, a geographical area may be, but need not be, continuous or connected. The data sets may be defined by different levels of granularity in the constituent areas defined thereby. In one embodiment, the one or more data sets defining constituent areas may be in the PostGIS format.

Each time a request is made for one or more geographical areas, the services computing entity 120 and/or user computing entity 105 may identify the one or more constituent areas of each geographical area and stitch the constituent areas together to define the geographical area. For example, a user may request and/or provide user input indicating the user would like to view a map of a particular geographical region, a particular portion of a map, and/or the like. The user input may be processed and map information/data may be accessed from the map information/data database. FIG. 7 provides a flowchart illustrating various process and procedures for determining geographical area boundaries and providing a geographical area for graphical presentation to a user (e.g., through display 416).

Starting at block 5, a location identifier is received. For example, the services computing entity 120 and/or user computing entity 105 may receive a location identifier. For example, as described above and as illustrated in the example user interface of FIG. 5A, a user (e.g., operating a user computing entity 105) may provide a location identifier through a user interface of the user computing entity 105 and/or the user computing entity 105 may provide a location identifier (e.g., determined by a GNSS/GPS sensor thereof). The location identifier may be a zip code, city and/or state, a geolocation determined by a location sensor of the user computing entity 105 (e.g., a GNSS/GPS sensor and/or the like), a portion of a map (e.g., determined through a user zooming in or out on a map displayed by the user interface of the user computing entity 105), and/or the like. In an example embodiment, the user computing entity 105 may provide (e.g., transmit) the location identifier. For example, the services computing entity 120 may receive the location identifier.

At block 10, the one or more geographical areas associated with the location identifier are identified or determined. For example, the services computing entity 120 and/or user computing entity 105 may identify or determine the geographical areas associated with a geographical region corresponding to the location identifier. For example, the geographical areas that correspond to the geographical region illustrated by the portion of the map to be displayed via the user interface may be identified. In an example embodiment, the geographical areas that correspond to a geographical region illustrated by the portion of the map to be displayed may be determined based at least in part on a zoom/detail level of the map to be displayed. As described above, in an example embodiment, the user may enter Boston, Mass., as the location identifier and all of the geographical areas in western Massachusetts, west central New England, the Boston metro area, and/or the like may be identified or determined as being associated with the location identifier. In some situations, instead of receiving a location identifier, the services computing entity 120 may simply receive one or more geographical area identifiers and/or geographical area names identifying one or more geographical areas. For example, a geographical area identifier may be an alphanumeric code configured to (uniquely) identify the corresponding geographical area within the computing environment of the services computing entity 120 (e.g., including within a dedicated application or web portal operating on the user computing entity 105). A geographical area name may be a name by which the geographical area may be referenced. For example, an example geographical area may be known by the geographical area name "South Boston" and be identified by the geographical identifier "3."

At block 15, the one or more constituent areas comprising each of the identified/determined geographical areas are determined and/or identified. For example, the services computing entity 120 and/or user computing entity 105 may determine and/or identify each of the one or more constituent areas comprising each of the identified/determined geographical areas. For example, a table may be accessed that maps, links, and/or the like each geographical area to one or more constituent areas. For example, FIG. 8 shows a portion of an example table that may be used to identify/determine the one or more constituent areas comprising a geographical area. For example, each geographical area identifier may be mapped, linked, and/or the like to one or more constituent area identifiers configured to uniquely identify the corresponding constituent area. In example embodiments, the constituent area identifiers are configured to (uniquely) identify the corresponding constituent area within the computing environment of the external information/data provider 115 and/or the services computing entity 120 (e.g., including within the dedicated application, website, online portal, and/or the like operating on the user computing entity 105 and configured to provide access to the platform provided by the services computing entity 120).

For example, FIG. 9A illustrates the constituent areas 62A, 62B, 62C, and 62D, which are defined by their respective boundaries 64A, 64B, 64C, and 64D. The constituent areas 62A, 62B, 62C, and 62D correspond to the geographical area 56. The constituent areas 62A, 62B, 62C, and 62D are illustrated as squares for simplicity, however, in various embodiments, a constituent area may have any arbitrary shape. Additionally, the constituent areas 62A, 62B, 62C, and 62D are illustrated as a contiguous area for simplicity, however, in an example embodiment, one or more constituent areas of a geographical area may not directly neighbor one or more other constituent areas of the geographical area. For example, the constituent areas of a geographical area do not need to be contiguous, in an example embodiment. For example, each constituent area may be associated with boundary information that defines the boundary of the constituent area. In an example embodiment, the boundary information for each constituent area comprises a plurality of geographical location points (e.g., 66A1, 66A2, 66A3, and 66A4) defining line segments that define the boundary of the corresponding constituent area. Thus, the one or more constituent areas corresponding to the geographical area may be identified, determined, and/or the like and the boundary information for each of the constituent areas corresponding to the geographical area may be accessed (e.g., from the boundary information/data database).

Continuing with FIG. 7, at block 20, the one or more constituent areas comprising a geographical area are stitched together to determine the boundaries of the corresponding geographical area. In an example embodiment, "stitching" together one or more constituent areas comprises defining a geographical area that is a union of the one or more constituent areas. In an example embodiment, stitching together one or more constituent areas comprises defining a boundary of a geographical area by combining the non-overlapping portions of the boundaries of the one or more constituent areas. In an example embodiment, stitching together one or more constituent areas comprises defining a boundary of a geographical area by determining a set of unique line segments, wherein each unique line segment is defined by the boundary information/data for one and only one of the one or more constituent areas. For example, the services computing entity 120 and/or user computing entity 105 may stitch together the one or more constituent areas comprising a geographical area to determine the boundaries of the corresponding geographical area. For example, the services computing entity 120 and/or user computing entity 105 may access (e.g., from the boundary information/data database) and/or request and receive (e.g., from the external information/data computing entity 115) boundary information/data for each of the constituent areas. The boundary information/data for each constituent area is associated with a constituent area identifier configured to uniquely identify the constituent area. The services computing entity 120 and/or user computing entity 105 may combine the constituent areas comprising the geographical area by selecting and/or accessing the boundary information/data associated with the constituent identifiers corresponding to the constituent areas comprising the geographical area and combining the non-overlapping portions of the constituent area boundaries to define the geographical area boundary. In some scenarios, constituent areas defined by different constituent defining data sets may be combined to form a geographical area. For example, the one or more constituent areas of a geographical area may be stitched together or combined to define a complex boundary of a geographical area that may be used by various graphical interface elements and logic in application programming interfaces (API) services.

In example embodiments, the boundary of the geographical area may then be determined by combining the exterior boundaries of the combined constituent areas. For example, the non-overlapping boundaries of the constituent areas may be combined to provide the boundary of the corresponding geographical area. For example, the geographical area may be defined as the union of the constituent areas. In an example embodiment, a geographical area and the boundary thereof may defined through a process similar to a contour integration of the boundaries of the corresponding constituent areas.

Continuing with FIG. 7, at block 25, the geographical area boundaries are rendered as an overlay layer on the map information/data. For example, the services computing entity 120 may render the boundaries of the one or more identified/determined geographical areas as an overlay layer (e.g., geographical area layer and/or constituent area layer) of the map information/data. For example, the geographical area boundaries may be provided, rendered, and/or displayed as semi-transparent and/or non-transparent lines in a geographical area layer of the map information/data on top of the map information/data. In an example embodiment, the geographical area name of each geographical area may also be displayed as part of the geographical area layer. At block 30, the geographical area boundary and map information/data rendering may be provided to the user computing entity 105 for display to the user (e.g., by display 416). For example, the services computing entity 120 may provide (e.g., transmit) the geographical area boundary and map information/data rendering may be provided to the user computing entity 105 for display to the user (e.g., by display 416). In an example embodiment, the user computing entity 105 may render and/or display the map information/data and the geographical area layer such that the map with the geographical area boundaries overlaid thereon is display to a user (e.g., by display 416). The stitching together of the constituent areas to define the boundary of the corresponding geographical area and the determining of constituent area definitions from multiple data sets is transparent to the client-side requests because the user computing entity 105 receives and/or renders fully-formed combined geographical area boundaries in real-time (or near real-time) with respect to the user computing entity 105 receiving a request for displaying the map (e.g., the location identifier, zooming/scrolling of the map, and/or the like).

FIG. 10 shows an example user interface 50. In FIG. 10, map information/data 51 is displayed via the user interface 50. The boundaries 54 of the geographical areas 56 are rendered as a layer of map information/data via the user interface of the user computing entity 105. As described above, a user (e.g., operating the user computing entity 105) may select (e.g., tap, click, input via voice, and/or the like) one or more geographical areas to select/de-select a geographical area. Selected geographical areas 58 are shown as shaded areas defined by the boundaries 54 of the geographical areas 56. Thus, in example embodiments, a graphical representation of socio-culturally defined areas may be provided to a user (e.g., displayed as an overlay of map information/data/information on display 416 of the user computing entity 105).

d. Combining Constituent Areas to Define a Geographical Area

As noted above with respect to block 20, one or more constituent areas may be combined to define a geographical area. FIG. 7A provides a technique for combining constituent areas to define a geographical area according to an example embodiment. For example, blocks 21, 22, and 23 are, in an example embodiment, sub-steps of the procedure of combining the constituent areas, as described with respect to block 20 above.

Starting at block 21, the boundary information/data for the constituent areas corresponding to a geographical area is accessed. For example, the services computing entity 120 and/or the user computing entity 105 may access the boundary information/data for the constituent areas corresponding to a geographical area from a boundary information/data database. In an example embodiment, the boundary information/data for each constituent area comprises a plurality of geographical location points defining line segments that define the boundary of the corresponding constituent area. For example, as shown in FIG. 9A, the boundary information/data corresponding to constituent area 62A comprises geographical location points 66A1, 66A2, 66A3, and 66A4, which define the line segments 66A1 to 66A2, 66A2 to 66A3, 66A3 to 66A4, and 66A4 to 66A1. In an example embodiment, the boundary of a constituent area is a connected set of line segments defined by a set of geographical location points provided by the boundary information/data corresponding to the constituent area. For example, a geographical location point may comprise a latitude and longitude defining a point on a map. In an example embodiment, the services computing entity 120 and/or user computing entity 105 may access the boundary information/data for the constituent areas. For example, the boundary information/data may be stored in a boundary information/data database that is cataloged by a constituent area identifier. The boundary information/data database may be updated regularly, periodically, as needed, and/or the like based on information/data received from the external information/data computing entity 115.

At block 22, unique portions of line segments are identified. For example, the portions of lines segments that define the boundary of the constituent areas corresponding to the geographical area may be analyzed to identify unique portions of line segments. For example, the services computing entity 120 and/or user computing entity 105 may identify unique portions of line segments from the line segments that define the boundaries of the constituent areas that comprise the geographical area. In an example embodiment, a unique portion of a line segment is defined within the boundary information of the one or more constituent areas that are defined by portions of line segments within the boundary information of only one of the one or more constituent areas. In an example embodiment, a unique line segment or portion of a line segment is a line segment or a portion thereof that is part of the boundary of one and only one of the constituent areas corresponding to the geographical area. For example, a unique line segment or portion of a line segment is defined by the boundary information/data of one and only one constituent area corresponding to a geographical area. For example, the boundary of the geographical area may be defined by the non-overlapping portions of the constituent area boundaries such that the geographical area is the union of the corresponding constituent areas.

FIG. 9B shows an example of how constituent areas 62A, 62B, 62C, and 62D are stitched together to define geographical area 56. The dotted lines show line segments of the constituent area boundaries 64A, 64B, 64C, and 64D that are shared by two or more of the constituent areas (e.g., defined by the boundary information/data of one or more of the constituent areas). The solid line 54 is the combination of the unique line segments (e.g., the line segments of the constituent area boundaries 64A, 64B, 64C, and 64D that are not shared between two or more constituent area boundaries and that are only present in one boundary of exactly one of the constituent areas). For example, the boundary 54 of the geographical area 56 comprising the constituent areas 62A, 62B, 62C, and 62D is defined by identifying one or more unique portions of line segments, wherein a unique portion of a line segment is defined within one and only one boundary of the constituent areas corresponding to the geographical area. For example, the boundary 54 of the geographical area consists of the lines segments of the boundaries 64A, 64B, 64C, and 64D of the constituent areas 62A, 62B, 62C, and 62D that do not overlap. For example, the boundary information of constituent area 64A defines a line segment between point 66A2 and 66A3 which overlaps with a corresponding line segment defined by the boundary information of constituent area 62B. In another example, the boundary information of constituent area 64A defines a line segment between points 66A1 and 66A2. The line segment between points 66A1 and 66A2 is a unique line segment (and/or unique portion of a line segment) and therefore defines at least a portion of the boundary of the geographical area 56. For example, the line segment defined by points 66A1 and 66A2 may be identified as a unique line segment and added to a set of line segments consisting of one or more unique portions of line segments, wherein the set of line segments defines the geographical area boundary 54.

FIG. 9C shows another example of a geographical area 56' in which the constituent areas that comprise the geographical area 62A, 62B, 62C, 62D, and 62E are not contiguous. Thus, the boundary 54' of the geographical area 56' is multipolygonal and comprises boundary 54A' and boundary 54B'.

At block 23, a set of unique line segments is defined. For example, the services computing entity 120 and/or the user computing entity 105 may define a set of unique line segments. For example, the set of unique line segments consists of the identified unique line segments and unique portions of line segments. In an example embodiment, the set of unique line segments defines the boundary of the geographical area. For example, the set of unique line segments defined by the boundary information/data corresponding to the constituent areas of the geographical area may define the boundary of the geographical area. The boundary of each of the identified/determined geographical areas may therefore be determined. The boundaries of a geographical area may be polygonal and/or multipolygonal. The boundary for the geographical area (e.g., the set of unique line segments) may then be used, as described above with respect to block 25, to render the boundary of the geographical area as part of a geographical area layer overlaid on the map information/data displayed to the user (e.g., via the display 416).

e. Determining an Incentive for a Customer

In various embodiments, a customer corresponding to a geographical area may be provided with an incentive, discount, and/or the like on one or more services the customer contracts, schedules, and/or the like to receive from a provider based on the number of customers contracting to receive one or more services from the provider within the geographical area. For example, if only two customers within geographical area A are currently contracted, scheduled, and/or the like to have provider X perform a service, the customers of geographical area A might not receive an incentive, discount and/or the like and/or may only receive a small incentive, discount and/or the like for the service performed by provider X. In another example, if ten customers within geographical area B are currently contracted, scheduled, and/or the like to have provider X perform a service, the customers of geographical area B may receive a larger incentive, discount, and/or the like. For example, the customers of geographical area B may receive a 5% discount, a 10% discount, and/or other incentive and/or the like for a service performed by provider X. In an example embodiment, an incentive, discount, and/or the like may be a percentage off of one or more services, a free additional service, a dollar amount off of one or more services, loyalty points, prize tickets, and/or the like.

FIG. 11 provides a flowchart illustrating process and procedures that may be used to determine an incentive, discount, and/or the like for a first customer contracting, scheduling, and/or the like to have a service performed by a provider and/or otherwise having the service performed by the provider, in an example embodiment. For example, the first customer may be a user contracting, scheduling, considering contracting/scheduling to have a service performed by a provider. For example, the first customer may be a user that is the customer party of a possible, pending, in process, and/or the like transaction with a provider. The incentive, discount, and/or the like for the first customer may be determined based on the number of second customers. The number of second customers is the number of users located within and/or corresponding to the same geographical area as the first customer and currently contracted, scheduled, and/or the like the have one or more services performed by the provider. In an example embodiment, the first customer is one of the second customers.

Starting at block 802, an incentive request is received. For example, a user computing entity 105 may generate an incentive request and provide (e.g., transmit) the incentive request to the services computing entity 120. For example, the user computing entity 105 may be triggered to generate an incentive request in response to a first customer providing user input (e.g., via the user interface) requesting information/data regarding scheduling, contracting, and/or the like with a provider to have a service performed. For example, a first customer may provide user input to view a services description corresponding to a provider. The user computing entity 105 may be triggered to generate an incentive request such that the first customer may be provided with information/data regarding the expected cost corresponding to the provider's services. In another example, a provider (e.g., operating a second user computing entity 105) may provide user input (e.g., via the user interface) indicating that a service has been performed and requesting that a financial and/or other transaction relating to the performance of the service(s) by the provider for a first customer be facilitated, completed, and/or the like by services computing entity 120. In an example embodiment, the reward request comprises a user/customer identifier configured to uniquely identify the first customer corresponding to the incentive request (e.g., the customer to whom the incentive information/data is to be provided and/or the customer for whom the service was performed). In an example embodiment, a payment computing entity 125 may be triggered to generate an incentive request when the payment computing entity 125 is processing a transaction, payment for service, and/or the like such that the transaction, payment, and/or the like may be adjusted in accordance with an incentive. In an example embodiment, an incentive request may comprise a geographical area identifier configured to uniquely identify the geographical area corresponding to the first customer (e.g., stored in the first customer profile) and/or where the service was/is to be performed. In an example embodiment, the incentive request may comprise a geographical area identifier and/or a user/customer identifier identifying the first customer for whom the service was/is to be performed. In an example embodiment, the incentive request comprises a provider identifier configured to uniquely identify the provider corresponding to the incentive request (e.g., the provider whose services are being investigated by the first customer and/or the provider who performed the service(s)).

At block 804, the first customer profile corresponding to the first customer is accessed from the user profile database. For example, the first customer profile corresponding to the first customer may be accessed in a customer profile database. For example, the services computing entity 120 may access the first customer profile from the user profile database and/or customer profile database using the user/customer identifier provided in the incentive request. In an example embodiment, the user profile database and/or customer profile database may be stored in memory 210 and/or 215.

At block 806, the geographical area associated with the first customer profile is determined and/or identified. For example, the services computing entity 120 may identify and/or determine a geographical area based on a location associated with the accessed first customer profile, a geographical area identifier stored in the first customer profile, and/or the like. For example, the first customer profile accessed using the user/customer identifier of the incentive request may comprise a services location such as a street address, geocode, geolocation, and/or the like corresponding to a location where a service is to be performed, goods are to be delivered, and/or the like. The services computing entity 120 may be configured to determine a geographical area within which the services location is located. In an example embodiment, the first customer profile accessed using the user/customer identifier of the incentive request comprises a geographical area identifier such as an alphanumeric code, a geographical area name, and/or the like.

At block 808, a set of geo-area customer profiles corresponding to the identified/determined geographical area are identified. For example, the services computing entity 120 may identify a set of geo-area customer profiles comprising the geographic area identifier corresponding to the identified and/or determined geographical area and/or having service locations located within the same geographic area as the first customer profile. For example, the services computing entity 120 may query the customer profile database and/or user profile database for customer profiles comprising the geographic area identifier.

At block 810, a set of second customer profiles is defined, determined, and/or identified from the set of geo-area customer profiles. For example, the second customer profiles are identified from the set of geo-area customer profiles corresponding to users (e.g., customers) who are currently contracted, scheduled, and/or the like to receive services from a provider corresponding to the provider identifier provided in the incentive request are identified. For example, when a user (e.g., customer) contracts, schedules, and/or the like to receive a service from a provider, a provider identifier identifying the provider may be stored in association with the user (e.g., customer) profile. Thus, in an example embodiment, all the users (e.g., customers) currently contracted, scheduled, and/or the like to have services provided by the provider may be identified. For example, the set of geo-area customer profiles may be queried to identify or determine the second user profiles comprising the provider identifier. For example, the services computing entity 120 may identify customer profiles from the set of geo-area customer profiles that comprise the provider identifier provided by the reward request to determine, define, and/or the like, the set of second customer profiles.

In an example embodiment, a set of provider-specific customer profiles corresponding to customers who are currently contracted, scheduled and/or the like to receive services from the provider may be identified and/or determined and that set of provider-specific customer profiles may be queried to identify/determine the second user profiles comprising the geographical area identifier. In an example embodiment, blocks 808 and 810 may be performed simultaneously by querying the user and/or customer profile database for user (e.g., customer) profiles comprising both the provider identifier and the geographical area identifier to determine, define, and/or the like the set of second customer profiles.

At block 812, the number of second customer profiles in the set of second customer profiles is determined. For example, the services computing entity 120 may determine the number of second customer profiles in the set of second customer profiles based on, for example, the results of blocks 808 and 810.

At block 814, an incentive table associated with and/or corresponding to the provider may be accessed. In an example embodiment, the incentive table may be determined by the services computing entity 120 and/or a user thereof. In another example embodiment, the provider may provide the incentive table. For example, when the provider registers, the provider may provide input of information/data for constructing an incentive table for the provider or the provider may upload, for example, a spreadsheet, comprising the incentive table. Thus, in various embodiments, the incentive table may be specific to the provider or may be generic to multiple providers. The incentive table associated with and/or corresponding to the provider may be accessed using the provider identifier provided with the incentive request. For example, the provider profile (e.g., a user profile corresponding to the provider) may be accessed from the profile database and/or provider database using the provider identifier. The provider profile may comprise the incentive table and/or an indication of which incentive table corresponds to the provider (in embodiments in which the services computing entity 120 store more than one incentive table). The incentive table may then be accessed. In another example embodiment, the incentive table may be accessed from an incentive table database using the provider identifier.

At block 816, the incentive is determined based on the accessed incentive table and the number determined at block 8122. For example, the incentive table may indicate that if 5 users (e.g., customers) are currently contracted, scheduled, and/or the like to receive one or more services from the provider within the geographic area, then a discount of 4% may be provided to each user for the services performed by the provider and if 8 users are currently contracted, scheduled, and/or the like to receive one or more services from the provider within the geographic area, then a discount of 6% may be provided to each user for the services performed by the provider, and/or the like. For example, the services computing entity 120 may determine the incentive based on the accessed incentive table and the number of second user profiles comprising the geographical area identifier and the provider identifier.

At block 818, the determined incentive may be provided. For example, the services computing entity 120 may provide (e.g., transmit) a transmission comprising the determined incentive. For example, the user computing entity 105 and/or payment computing entity 125 that provided the incentive request may receive the transmission comprising the determined incentive. In an example embodiment, the user computing entity 105 may execute the received transmission, thereby causing the user computing entity 105 to display the determined incentive via the user interface of the application, website, online portal, and/or the like provided by the services computing entity 120. A user (e.g., customer) may experience the determined incentive being displayed in real time and/or near real time with the user input and/or selection that triggered the incentive request. FIG. 11A provides an example view of a user interface (e.g., displayed via the display 416 of the user computing entity 105) providing a determined award, incentive, discount, and/or the like to a user (e.g., customer) for the user's review. In an example embodiment, the payment computing entity 125 may receive and execute the transmission comprising the determined reward, thereby causing the payment computing entity 125 to modify a transaction being processed in real time and/or near real time. For example, the transmission comprising the determined incentive may be executed by the payment computing entity 125 and thereby cause the payment computing entity 125 to adjust an amount debited from a financial account and/or account associated with the first customer profile and/or adjust the amount credited to a financial account and/or account associated with the provider profile (e.g., the user profile corresponding to the provider in the transaction).

f. Managing Referral Credits

In various embodiments, a user (e.g., a provider or a customer) may refer a new user to access the application, website, online portal, and/or otherwise access the platform provided by the services computing entity 120. For example, a user may refer a new user to be provider and to offer one or more services for one or more geographical areas through the platform provided by the services computing entity 120. For example a user may refer a new user to be a customer and to contract, schedule, and/or have one or more services performed through the platform provided by the services computing entity 120.

FIG. 12 provides a flowchart illustrating processes and procedures that may be used to manage, track, provide, and/or the like a referral credit, bonus, and/or the like, according to example embodiments. Starting at block 902, a referral interface is provided to a first user (e.g., a customer and/or provider operating a user computing entity 105). For example, the services computing entity 120 may provide (e.g., transmit) first computer executable code configured to, when executed, causes a display device of the first user computing entity to provide a first user interface. A first user computing entity 105 may receive the first computer execute code and execute the first executable code. Execution of the first executable code by the first user computing entity 105 may cause an application to be downloaded and/or to operate on the first user computing entity 105, cause the first user computing entity 105 to access a website, online portal, and/or other platform provided by the services computing entity 120 and accessible via the first user computing entity 105 to provide the first user interface. In an example embodiment, the first user interface is and/or comprises a referral interface. Thus, the services computing entity 120 may provide a referral interface provided (e.g., displayed) to a first user by the first user computing entity 105.

At block 904, the first user may provide referral information/data through the referral interface. For example, the user (e.g., operating the user computing entity 105) may provide referral information/data through the referral interface and the user computing entity 105 may provide (e.g., transmit) the referral information/data (or at least a portion thereof) to the services computing entity 120. In example embodiments, the referral information/data may comprise contact information/data for a second user (e.g., comprising an electronic destination address such as a social media account identifier/handle, an email address, phone number for capable of receiving MMS and/or SMS messages, and/or the like), information/data identifying the first user (e.g., a user account/profile identifier and/or the like), the (expected) type of the second user (e.g., customer or provider), and/or the like. In an example embodiment, the second user is a user that the first user is referring to the platform provided by the services computing entity 120. Thus, the services computing entity 120 may receive the referral information/data (or at least a portion thereof) provided by the first user through the referral interface accessed via the user computing entity 105).

At block 906, a referral code and referral link is generated and provided. For example, the services computing entity 120 may generate a referral code and a referral link based at least in part on the referral information/data. The services computing entity 120 may provide at least the referral link to the referred/second user by providing an electronic message to at least one electronic destination address provided as part of the referred/second user contact information. For example, a referral code may be generated that identifies the first user, the referred/second user, the (expected) type of the referred user (e.g., customer or provider), the type of the first user (e.g., customer or provider), and/or the like. In example embodiments, a referral link may be generated. The referral link may encode the referral code and/or be linked to, associated with, and/or the like the referral code. In example embodiments, the referral link may be configured to provide the referred/second user (e.g., operating the second user computing entity 105) with easy access to an application for download onto and execution by a user computing entity 105 and/or a website, portal and/or the like accessible via the second user computing entity 105. In example embodiments, the referral link may be provided to the referred user (e.g., operating a user computing entity 105) by email, text, instant message, SMS, MMS, and/or the like. For example, the referral link may be provided to the referred user so that the referral link may be provided to the referred user (e.g., displayed, provided in a selectable manner) by a second user computing entity 105. For example, the execution of the referral link by the second user computing entity 105 may cause the second user computing entity 105 receive and execute second computer executable code that, when executed by the second user computing entity 105, causes the second user computing entity 105 to access an application, website, online portal, and/or the like and provide the referred/second user with a second user interface for completing the registration process.

At block 908, user selection of the referral link is received. For example, the services computing entity 120 may receive an indication that the referred user (e.g., operating a second user computing entity 105) selected the referral link. For example, the user may click a referral link provided in an email or other electronic message type. The second user computing entity 105 may then provide a registration request based on the referral link. The services computing entity 120 may receive the registration request based on the referral link, referral code associated with and/or encoded by the referral link, and/or another indication of the user selection of the referral link. For example, the services computing entity 120 may generate and/or provide second computer executable code.

At block 910, a dedicated application may be downloaded and/or opened by the user computing entity 105 operated by the referred user and/or the second user computing entity 105 operated by the referred user may access a website, online portal, dashboard, and/or the like provided by the services computing entity 120. For example, the second user computing entity 105 may receive the second executable computer code and execute the second executable computer code. Execution of the second executable computer code may cause the second user computing entity 105 access the app store and initiate download of the dedicated application. In another example, execution of the second executable computer code causes the second user computing entity 105 to open a browser and access an online portal provided by the services computing entity 120. In an example embodiment, the referral link comprises the second executable computer code and user selection of the referral link causes execution of the second executable computer code by the second user computing entity 105.

At block 912, in response to receiving the indication of the user selection of the referral link; downloading of the application by the second user computing entity 105; accessing of the website, online portal, and/or the like by the second user computing entity 105; and/or the like, it may be determined if a user account corresponding to the referred/second user exists. For example, the user computing entity 105 associated with the referred/second user may determine any cookies and/or the like identifying accounts associated with the services computing entity 120 and/or a dedicated application, website, and/or online portal associated therewith exist in an account database stored by and/or accessible to the services computing entity 120. In another example, the services computing entity 120 may determine if the referred/second user contact information/data is associated with any user profiles stored in the user profile database. In another example, a registration interface is provided to the referred/second user (e.g., via a second user computing entity 105) and information/data identifying the referred/second user may be received therethrough. The information/data identifying the referred/second user may be checked against existing user profiles to determine if the referred/second user corresponds to an existing user profile. In an example embodiment, it may be determined if a user profile corresponding to the referred/second user already exists responsive to receiving the referral information/data or responsive to receiving profile information/data corresponding to the referred/second user.

If, at block 912, it is determined that a profile corresponding to the referred/second user exists, an error may be provided at block 914. For example, if the services computing entity 120 determines that the referred/second user corresponds to an existing profile (e.g., a profile stored in the profile database and/or the like), then the services computing entity 120 may provide an error message. In example embodiments, the error message may be configured to be received and executed by the user computing entity 105. Execution of the error message by the user computing entity 105 may cause an error notification to be displayed or otherwise provided by the second user computing entity 105 to the referred/second user. For example, the error notification may indicate that the referred/second user is not eligible for a referral bonus, credit, and/or the like as the referred/second user is already registered with the services computing entity 120.

If, at block 912, it is determined that a profile corresponding to the referred/second user does not exist, a new profile for the referred/second user may be generated, registered, and/or the like using the generated referral code at block 916. For example, the referral link may encode and/or be associated with the referral code such that upon receiving the indication of the user selection of the referral link, the second user computing entity 105 and/or the services computing entity 120 may identify the referral code. Thus, a new profile may be registered for the referred/second user (e.g., operating the user computing entity 105). For example, the new profile may be generated, registered, and/or the like and the referred/second user may provide profile information/data through a registration interface provided by the application, website, online portal, and/or the like via the second user computing entity 105. For example, the profile information/data may comprise referred/second user identifying information, referred/second user contact information, referred/second user/services location address, user type (e.g., customer or provider), financial account information/data (e.g., for making and/or receiving payments for services received and/or provided), and/or the like. For example, when the user profile for the referred/second user profile is generated, an account associated with the user profile may be also be generated. The account may be credited and/or debited based on user interaction with the application, website, online portal, and/or the like associated with the services computing entity 120 and/or based on transactions conducted with other users (e.g., customers and/or providers). For example, the account associated with the referred/second user profile may receive and/or provide funds to/from the financial account indicated by the financial account information/data. In example embodiments, if the user type for the referred/second user is provider, the profile information/data may further comprise area(s) serviced, services provided, pricing information/data, provider description, and/or the like. In example embodiments, the referred/second user may provide the profile information/data through a registration interface provided through the application, website, online portal, and/or the like via the user computing entity 105. In example embodiments, a form field of the registration interface may be a form field configured to receive therein a referral code. In example embodiments, the referral code may be prepopulated based on the referral code encoded in and/or associated with the referral link. In example embodiments, the form field for receiving the referral code may not be displayed by the second user computing entity 105 as the form field has been prepopulated/filled automatically based on the referral code encoded within and/or associated with the referral link.

In an example embodiment, if the referred/second user is a customer, then when the second user computing entity 105 displays a list of one or more providers, the first user and/or providers with whom the first user has contracted, scheduled and/or the like with to perform one or more services may be marked as preferred providers.

At block 918, the first service associated with the new profile corresponding to the referred/second user is completed. For example, if the referred/second user is a customer, a provider may provide a service to the referred/second user and then mark the service as completed (e.g., operating a user computing entity 105) using an application, website, online portal, and/or the like associated with the services computing entity 120 and provided to the provider via the user computing entity 105. In another example, if the referred/second user is a provider, the referred/second user may provide a service to a customer and then mark the service as completed (e.g., operating a user computing entity 105) using an application, website, online portal, and/or the like associated with the services computing entity 120 and provided to the provider via the user computing entity 105. Thus, the services computing entity 120 receives an indication that a first service associated with the user profile corresponding to the referred/second user is completed. For example, a user computing entity 105 may receive user input indicating that a user profile corresponding to the referred/second user is associated with a completed service, a pending transaction, and/or the like.

At block 920, in response to receiving the indication that the first service associated with the user profile corresponding to the referred/second user is completed and/or that a transaction associated with the user profile corresponding to the referred/second user is pending, a referral bonus, credit, and/or the like is credited to the referred/second user. For example, the services computing entity 120 my credit an account corresponding to the referred/second user profile with a referral bonus, credit, and/or the like. In an example embodiment, the referral bonus, credit, and/or the like may be determined based at least in part on the user type associated with the user profile of the referred/second user. In an example embodiment, a provider referral bonus, credit, and/or the like (e.g., provided when the user type associated with the user profile of the referred/second user is provider) may be different (e.g., larger) than a customer referral bonus, credit, and/or the like (e.g., provided when the user type associated with the user profile of the referred/second user is customer). For example, if the referred/second user is a provider, the account associated with the referred/second user profile may be credited a provider referral bonus, credit, and/or the like. Similarly, if the referred/second user is a customer, the account associated with the referred/second user profile may be credited a customer referral bonus, credit, and/or the like. For example, the type of referral bonus, credit, and/or the like provided may depend on the referred/second user's type (e.g., customer or provider), but not on the first user's type (e.g., the first user being the user that referred the referred/second user). In example embodiments, the referral bonus, credit, and/or the like may be a dollar amount, a services credit, and/or the like. For example, if the referred/second user is a provider, crediting the account corresponding to the referred/second user profile may comprise depositing a provider referral bonus, credit, and/or the like to a financial account identified in the referred/second user profile information/data. For example, the services computing entity 120 may instruct the payment computing entity 125 to process a payment in the amount of the provider referral bonus, credit, and/or the like and deposit the payment into a financial account identified in the user profile information/data corresponding to the referred/second user. In another example, if the referred user is a customer, crediting the account corresponding to the referred/second user profile may comprise assigning a credit in the amount of the customer referral bonus, credit, and/or the like to the account corresponding to the referred/second user profile that may be used to pay for services scheduled through the dedicated application and/or online portal provided by the services computing entity 120. In such embodiments, when the customer makes a payment to a provider, the account corresponding to the customer and stored by the services computing entity 120 may be identified to determine if any credits have been assigned thereto. In an example embodiment, if the referred/second user is a customer, at least a portion of the referral bonus, credit, and/or the like may be automatically applied to a pending transaction corresponding to the referred/second user profile. In example embodiments, the crediting of the referral bonus, credit, and/or the like to the account corresponding to the referred/second user profile may be based at least in part on the referred/second user's user type (e.g., customer or provider). In example embodiments, after, in response to, and/or (substantially) simultaneously (e.g., in real time or near real time simultaneously) with the referral bonus, credit, and/or the like being credited to the account corresponding to the referred/second user profile, a push notification or other notification may be provided to the referred/second user (e.g., through the second user computing entity 105) indicating that the account corresponding to the referred/second user profile has been credited with the referral bonus, credit, and/or the like.

At block 922, a referral bonus, credit, and/or the like may be credited to the account corresponding to the first user. For example, the services computing entity 120 my credit the account corresponding to the first user profile with a referral bonus, credit, and/or the like. For example, if the referred/second user is a provider, the account associated with the first user may be credited a provider referral bonus, credit, and/or the like. Similarly, if the referred/second user is a customer, the account associated with the first user may be credited a customer referral bonus, credit, and/or the like. For example, the type of referral bonus provided may depend on the referred/second user's user type (e.g., customer or provider), but not on the first user's user type. In example embodiments, the referral bonus, credit, and/or the like may be a dollar amount, a services credit, and/or the like. For example, if the first user is a provider, crediting the account corresponding to the first user profile may comprise depositing a referral bonus, credit, and/or the like to a financial account identified in the profile information/data corresponding to the first user profile corresponding to the first user. For example, the services computing entity 120 may instruct the payment computing entity 125 to process a payment in the amount of the referral bonus, credit, and/or the like and deposit the payment into a financial account identified in the profile information/data corresponding to the first user profile corresponding to the first user. In another example, if the first user is a customer, crediting the account corresponding to the first user may comprise assigning a credit in the amount of the referral bonus, credit, and/or the like to the account corresponding to the first user profile that may be used to pay for services scheduled through the application, website, online portal, and/or the like provided by the services computing entity 120. For example, the services computing entity 120 may credit an account corresponding to the first user profile with a referral bonus, credit, and/or the like. In such embodiments, when the first user makes a payment to a provider, the account corresponding to the first user profile may be identified to determine if any credits have been assigned thereto. In example embodiments, the crediting of the referral bonus, credit, and/or the like to the account corresponding to the first user profile may be based at least in part on the first user's user type, however, the amount of the referral bonus, credit, and/or the like is determined based on the referred/second user's user type. In example embodiments, after, in response to, and/or (substantially) simultaneously (e.g., in real time or near real time simultaneously) with the referral bonus, credit, and/or the like being credited to the account corresponding to the first user profile, a push notification or other notification may be provided to the first user (e.g., through the first user computing entity 105) indicating that the account corresponding to the first user profile has been credited with the referral bonus, credit, and/or the like.

In example embodiments, the registration process may comprise registering the referred/second user with a payment computing entity 125 in communication with the services computing entity 120. For example, a user profile stored by the services computing entity 120 may be associated with an account stored by the payment computing entity 125. For example, the user profile may store information/data identifying the account corresponding to the user. In such embodiments, the user profile may not include financial account information/data. Thus, a transaction between a customer and a provider may include accessing and/or requesting information/data regarding the account for the customer to determine if there are any credits assigned thereto, modifying the payment due from the customer based on any credits, causing the payment computing entity 125 to debit the adjusted payment from the customer's financial account and deposit the unadjusted payment to the provider's financial account.

In an example embodiment, a profile generated for the referred/second user may comprise information regarding the first user. For example, the referred/second user profile may comprise a referring user attribution that captures the service information (e.g., which service providers the first user is currently contracted with, scheduled, and/or the like to have services performed by) for the first user. In an example embodiment, when the referred/second user access the application, website, online portal, and/or the like, the referrer's service information is presented to the referred/second user. For example, when the referred/second user accesses a list of providers, the providers used by the first user may be provided at the top of the list.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for rendering a geographical map for display, the method comprising:
   responsive to receiving an indication of a geographical area, identifying, by at least one processor, one or more constituent areas associated with the geographical area;
   accessing, by the at least one processor, boundary data corresponding to the one or more constituent areas, the boundary data for each constituent area comprising a plurality of geographical location points defining line segments that define the boundary of the corresponding constituent area;
   defining a boundary of the geographical area by:
      identifying, by the at least one processor, one or more non-overlapping unique portions of the line segments by determining which one or more portions of a first line segment that are defined within the boundary data of a first constituent area of the one or more constituent areas does not geographically overlap with any second line segments, wherein the second line segments are defined within the boundary data of a second constituent area of the one or more constituent areas; and
      stitching together, by the at least one processor, the one or more non-overlapping unique portions of the line segments to define the boundary of the geographical area;
   defining, by the at least one processor, a geographical area boundary layer, the geographical boundary layer comprising a set of line segments representing the boundary of the geographical area; and
   providing, by the at least one processor, a geographical map for display via an interface comprising a plurality of layers, wherein the plurality of layers comprises one or more map layers and the geographical area boundary layer.

2. The method of claim 1, further comprising receiving a first user input via the interface, wherein the first user input comprises a location indicator and the geographical area is identified based at least in part on the location indicator.

3. The method of claim 1, wherein the one or more map layers correspond to a geographical region comprising at least a portion of the geographical area.

4. The method of claim 1, wherein the geographical area boundary layer comprises a displayed line indicating the location of the geographical area boundary with respect to the one or more map layers.

5. The method of claim 1, further comprising:
   receiving a second user input via the user interface, the second user input comprising a user-selection of a point located within an area enclosed by the geographical area boundary; and
   providing the at least one processor with an indication of user selection of the geographical area.

6. The method of claim 5, further comprising responsive to receiving the indication, updating user profile data corresponding to a user profile to comprise a geographical area identifier corresponding to the geographical area, the user profile stored in the at least one memory.

7. The method of claim 1, wherein the set of line segments is a connected set.

8. An apparatus comprising at least one processor, at least one memory storing computer program code, and at least one user interface, the at least one memory and the computer program code configured to, with the processor, cause the apparatus to at least:
   responsive to receiving an indication of a geographical area, identify one or more constituent areas associated with the geographical area;
   access boundary data corresponding to the one or more constituent areas, the boundary data for each constituent area comprising a plurality of geographical location points defining line segments that define the boundary of the corresponding constituent area;
define a boundary of the geographical area by:
identifying one or more non-overlapping unique portions of the line segments by determining which one or more portions of a first line segment that are defined within the boundary data of a first constituent area of the one or more constituent areas does not geographically overlap with any second line segments, wherein the second line segments are defined within the boundary data of a second constituent area of the one or more constituent areas; and
stitching together the one or more non-overlapping unique portions of the line segments to define the boundary of the geographical area;
define a geographical area boundary layer, the geographical boundary layer comprising a set of line segments representing the boundary of the geographical area; and
provide a geographical map for display via an interface comprising a plurality of layers, wherein the plurality of layers comprises one or more map layers and the geographical area boundary layer.

9. The apparatus of claim 8, wherein the at least one memory and the computer program code are further configured to, with the processor, cause the apparatus to receive a first user input via the interface, wherein the first user input comprises a location indicator and the geographical area is identified based at least in part on the location indicator.

10. The apparatus of claim 8, wherein the one or more map layers correspond to a geographical region comprising at least a portion of the geographical area.

11. The apparatus of claim 8, wherein the geographical area boundary layer comprises a displayed line indicating the location of the geographical area boundary with respect to the one or more map layers.

12. The apparatus of claim 8, wherein the at least one memory and the computer program code are further configured to, with the processor, cause the apparatus to at least:
receive a second user input via the user interface, the second user input comprising a user-selection of a point located within an area enclosed by the geographical area boundary; and
provide the at least one processor with an indication of user selection of the geographical area.

13. The apparatus of claim 12, wherein the at least one memory and the computer program code are further configured to, with the processor, cause the apparatus to at least, responsive to receiving the indication, updating user profile data corresponding to a user profile to comprise a geographical area identifier corresponding to the geographical area, the user profile stored in the at least one memory.

14. The apparatus of claim 8, wherein the set of line segments is a connected set.

15. A computer program product comprising at least one non-transitory computer-readable storage medium having computer-executable program code instructions stored therein, the computer-executable program code instructions comprising program code instructions configured to:
responsive to receiving an indication of a geographical area, identify one or more constituent areas associated with the geographical area;
access boundary data corresponding to the one or more constituent areas, the boundary data for each constituent area comprising a plurality of geographical location points defining line segments that define the boundary of the corresponding constituent area;
define a boundary of the geographical area by:
identifying one or more non-overlapping unique portions of the line segments by determining which one or more portions of a first line segment that are defined within the boundary data of a first constituent area of the one or more constituent areas does not geographically overlap with any second line segments, wherein the second line segments are defined within the boundary data of a second constituent area of the one or more constituent areas; and
stitching together the one or more non-overlapping unique portions of the line segments to define the boundary of the geographical area;
define a geographical area boundary layer, the geographical boundary layer comprising a set of line segments representing the boundary of the geographical area; and
provide a geographical map for display via an interface comprising a plurality of layers, wherein the plurality of layers comprises one or more map layers and the geographical area boundary layer.

16. The computer program product of claim 15, wherein the computer-executable program code instructions further comprise program code instructions configured to receive a first user input via the interface, wherein the first user input comprises a location indicator and the geographical area is identified based at least in part on the location indicator.

17. The computer program product of claim 15, wherein the one or more map layers correspond to a geographical region comprising at least a portion of the geographical area.

18. The computer program product of claim 15, wherein the geographical area boundary layer comprises a displayed line indicating the location of the geographical area boundary with respect to the one or more map layers.

19. The computer program product of claim 15, wherein the computer-executable program code instructions further comprise program code instructions configured to:
receive a second user input via the user interface, the second user input comprising a user-selection of a point located within an area enclosed by the geographical area boundary; and
provide the at least one processor with an indication of user selection of the geographical area.

20. The computer program product of claim 19, wherein the computer-executable program code instructions further comprise program code instructions configured to, responsive to receiving the indication, updating user profile data corresponding to a user profile to comprise a geographical area identifier corresponding to the geographical area, the user profile stored in the at least one memory.

* * * * *